Nov. 29, 1938.   W. F. GROENE ET AL   2,138,522
FOUR-SPINDLE DRUM TYPE CRANKSHAFT LATHE
Filed May 16, 1936   12 Sheets-Sheet 1

Fig. 1.

INVENTORS.
WILLIAM F. GROENE
AND WALTER R. MEYER.
BY
Allen & Allen
ATTORNEYS.

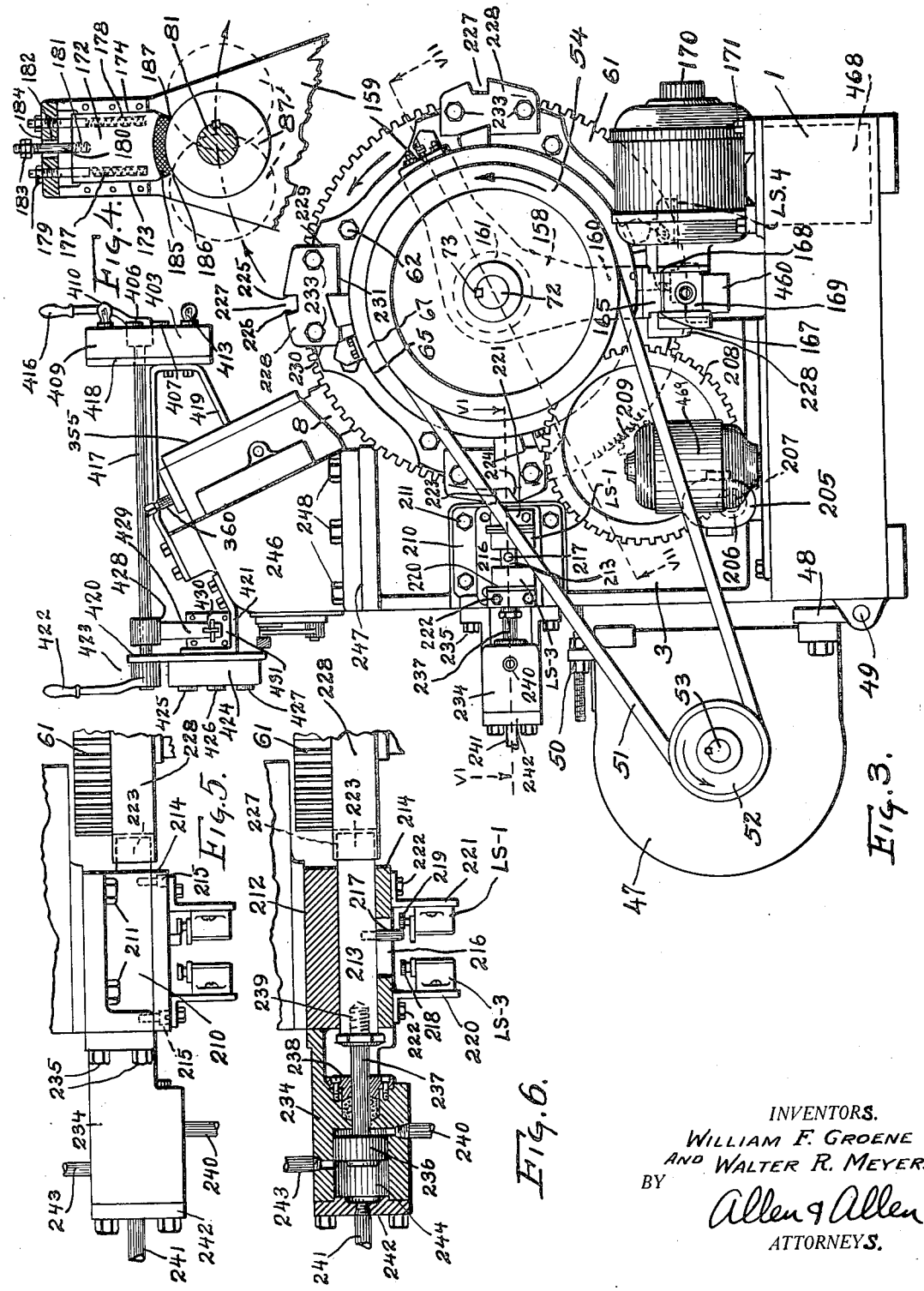

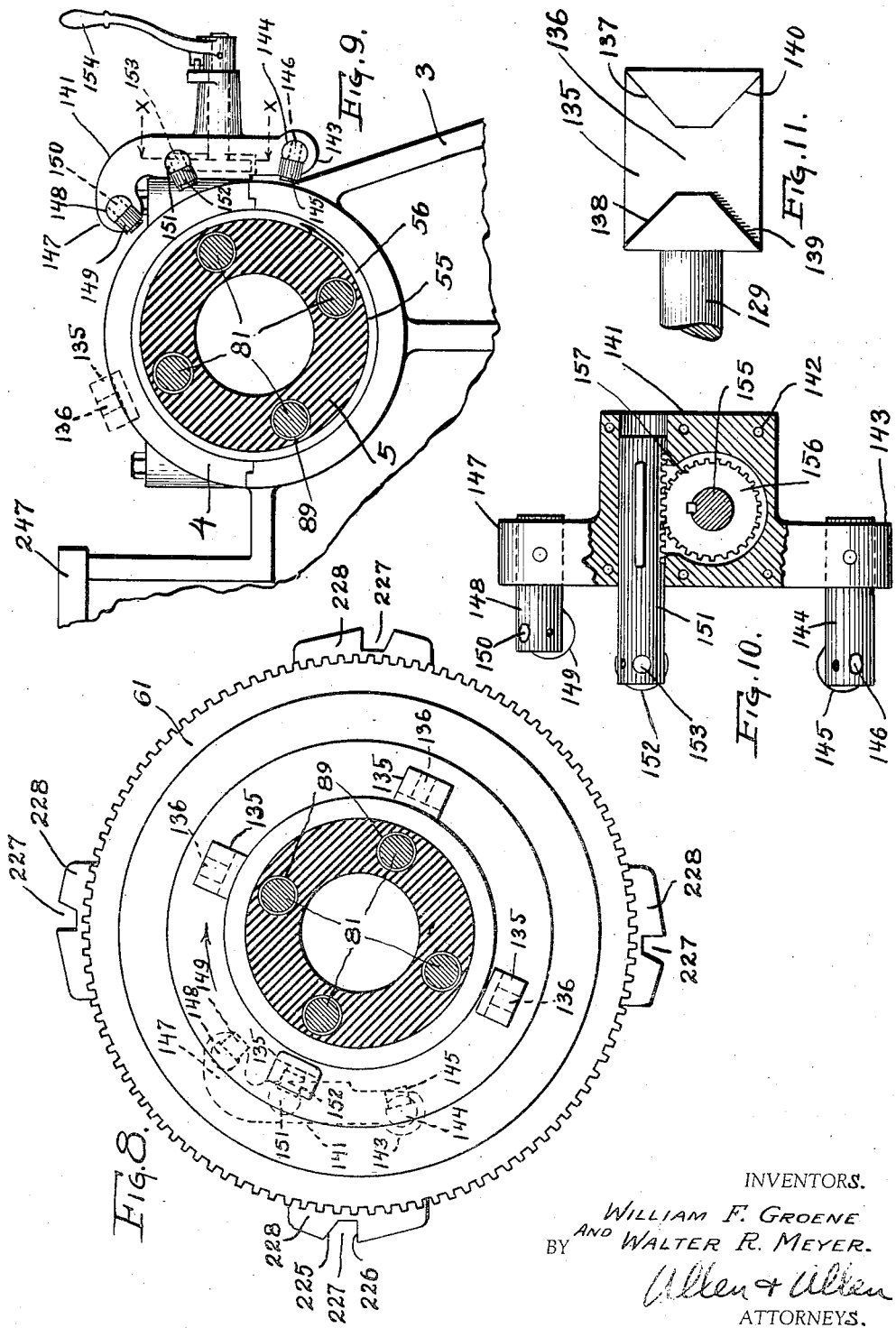

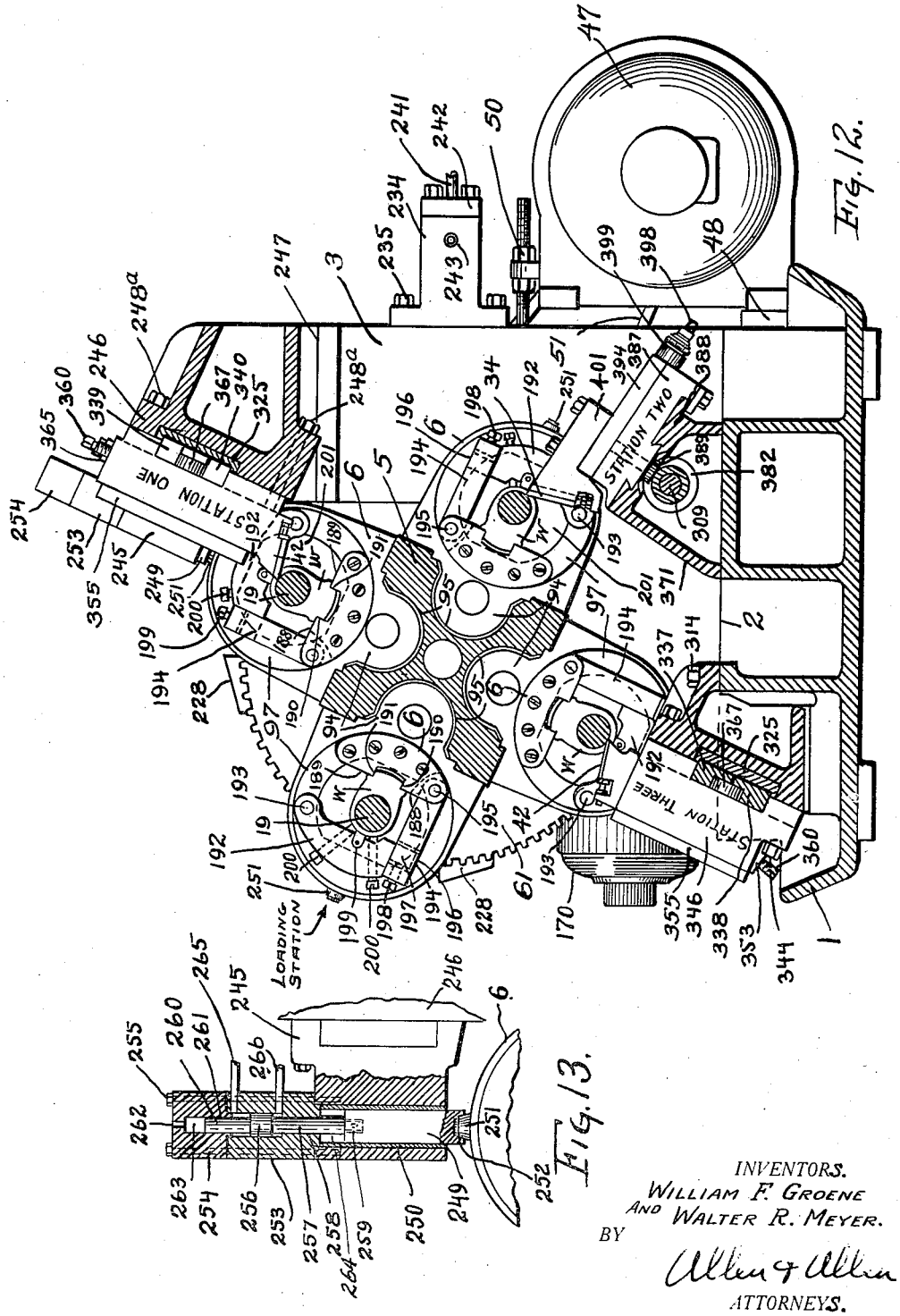

Nov. 29, 1938. W. F. GROENE ET AL 2,138,522
FOUR-SPINDLE DRUM TYPE CRANKSHAFT LATHE
Filed May 16, 1936 12 Sheets-Sheet 7
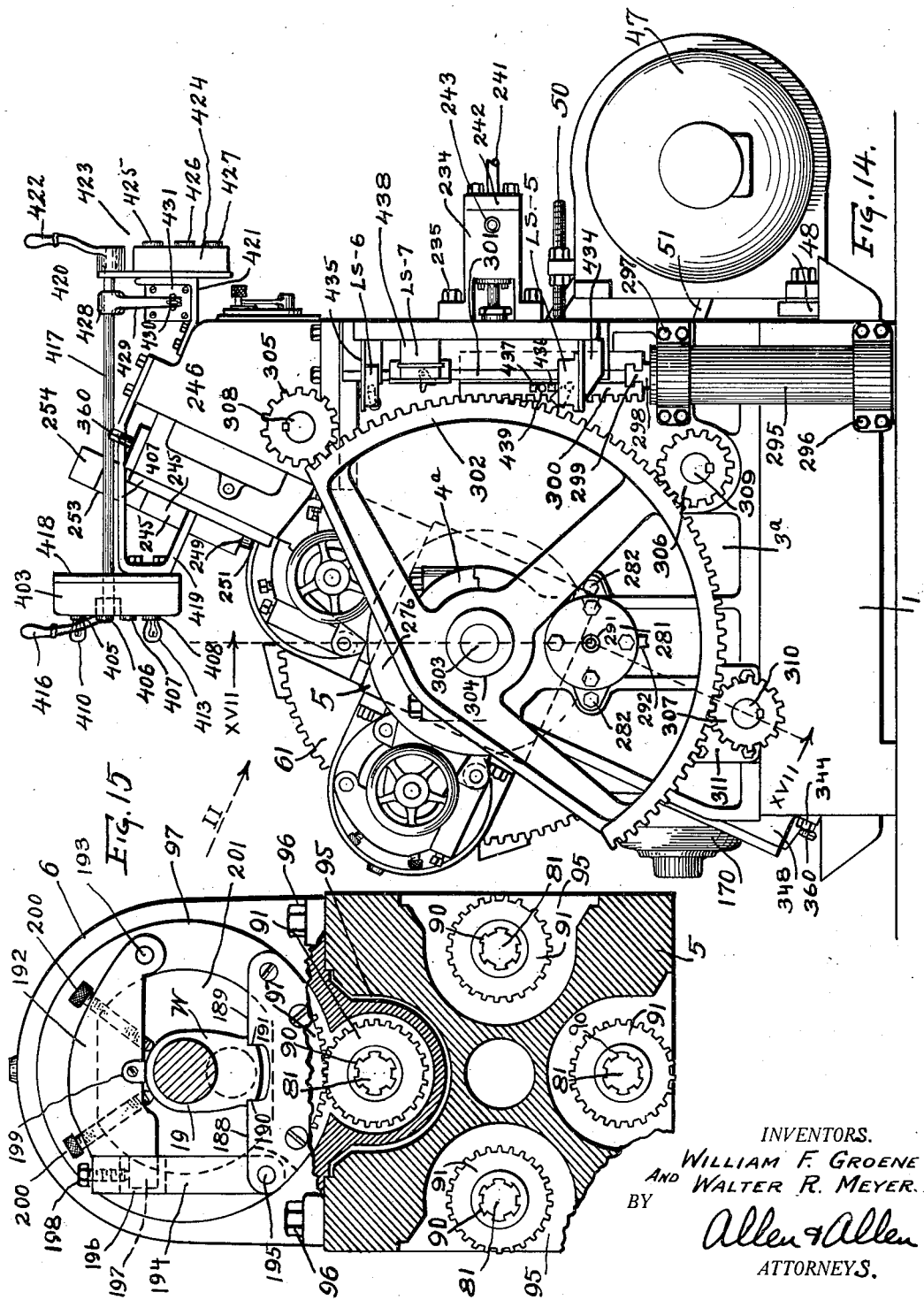
INVENTORS.
WILLIAM F. GROENE
AND WALTER R. MEYER.
BY
Allen & Allen
ATTORNEYS.

Nov. 29, 1938.  W. F. GROENE ET AL  2,138,522
FOUR-SPINDLE DRUM TYPE CRANKSHAFT LATHE
Filed May 16, 1936   12 Sheets-Sheet 8
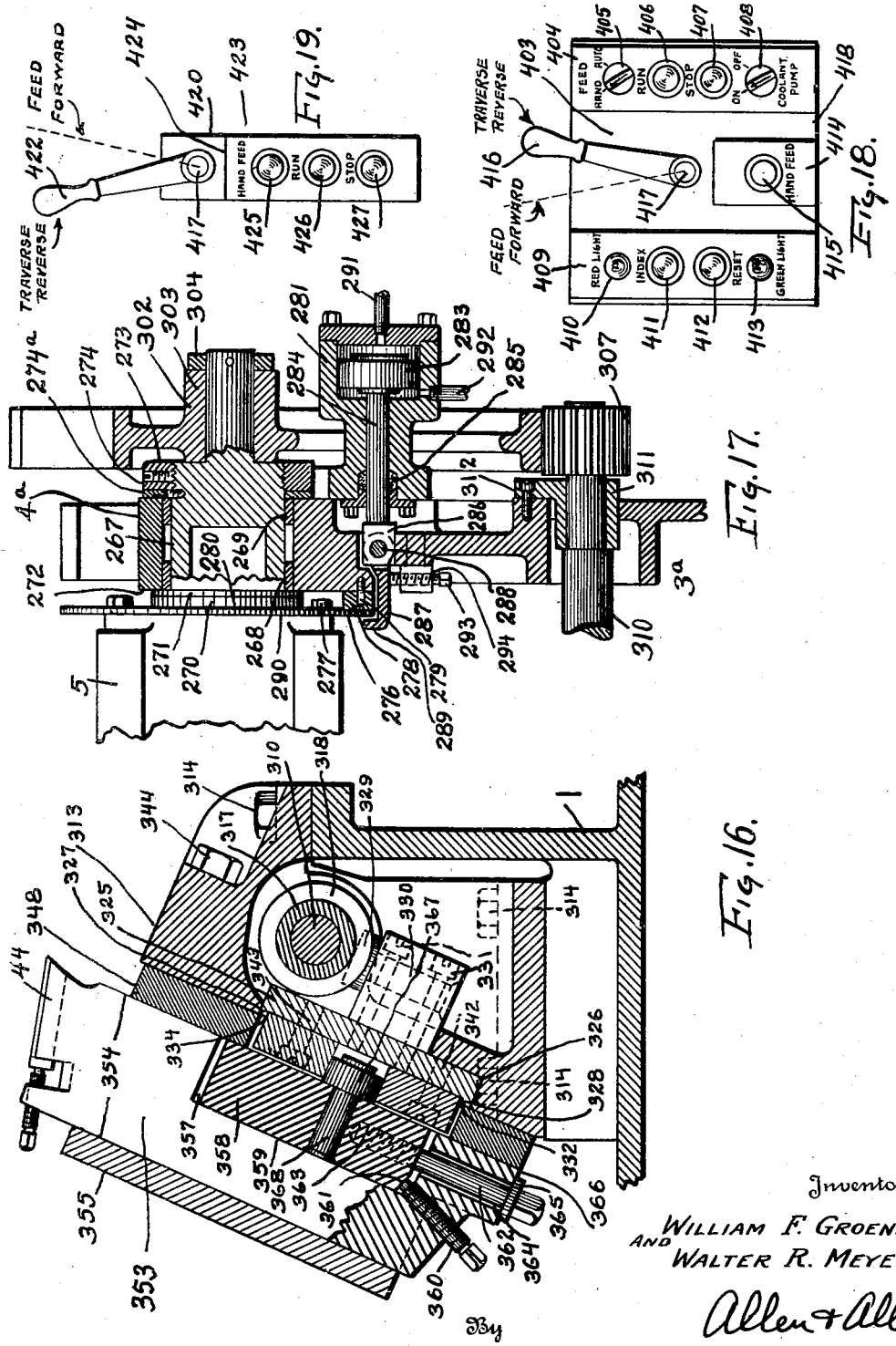
Inventors
WILLIAM F. GROENE
AND WALTER R. MEYER.
By Allen + Allen
Attorneys.

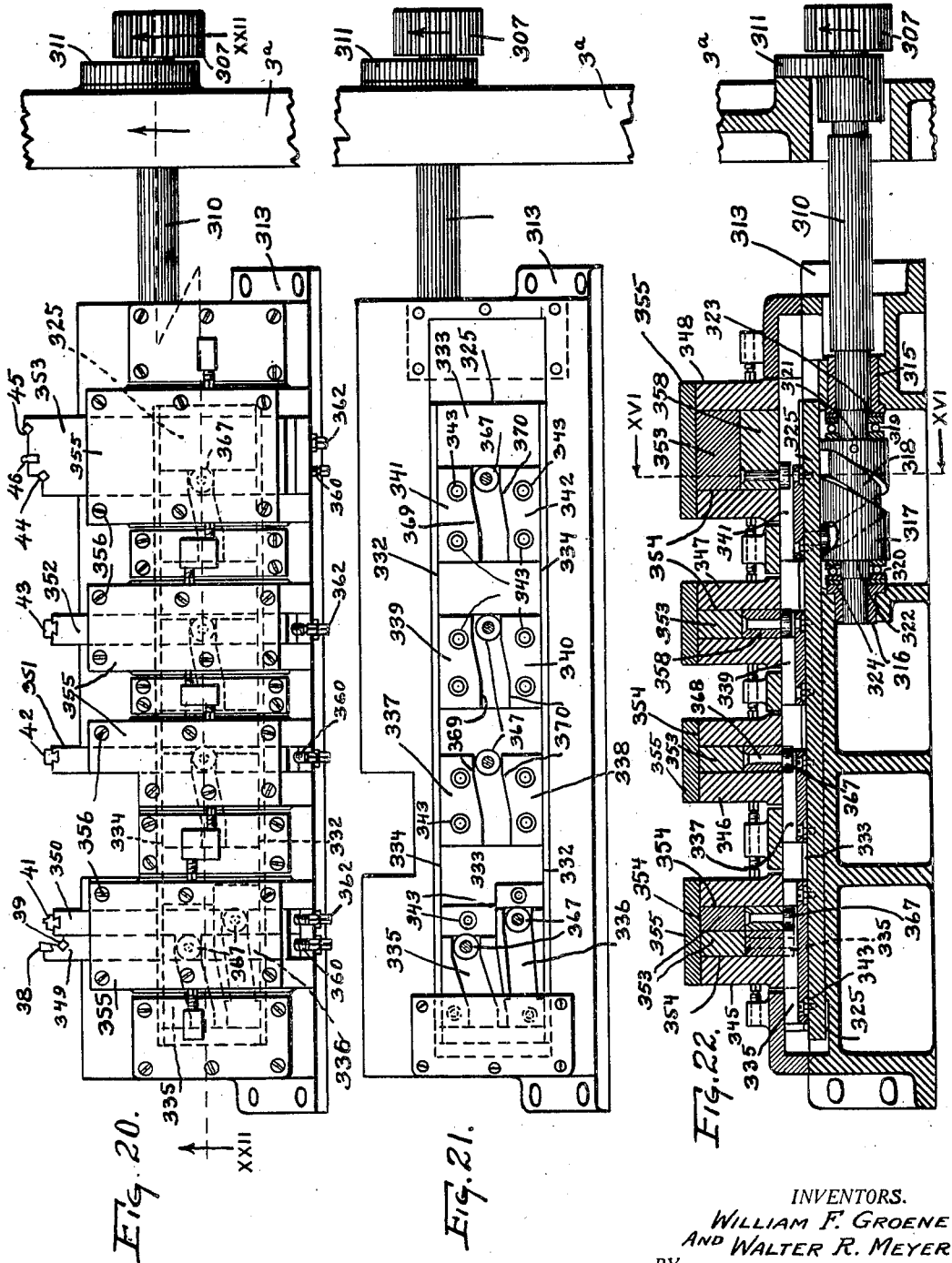

Nov. 29, 1938. W. F. GROENE ET AL 2,138,522
FOUR-SPINDLE DRUM TYPE CRANKSHAFT LATHE
Filed May 16, 1936 12 Sheets-Sheet 10
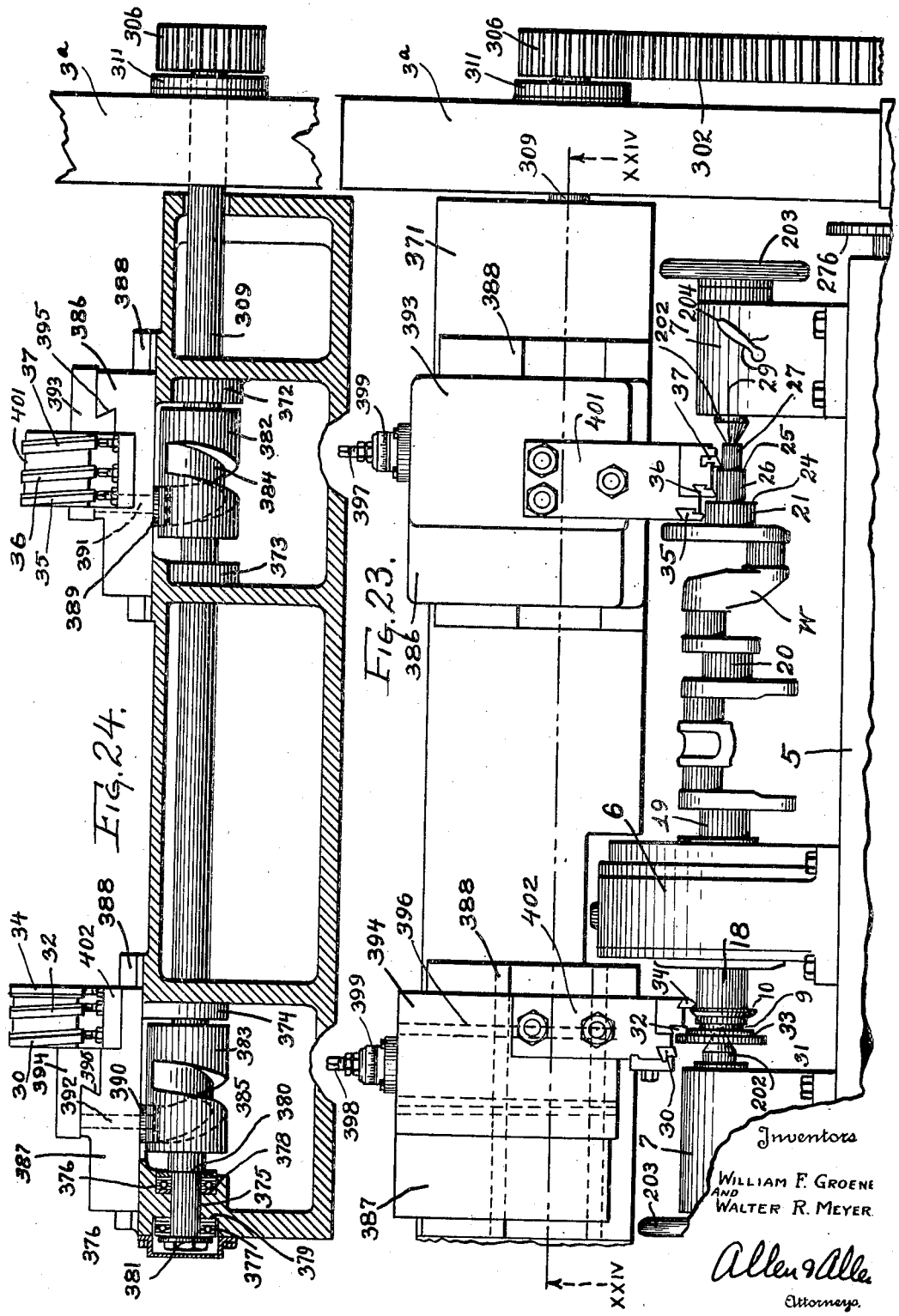

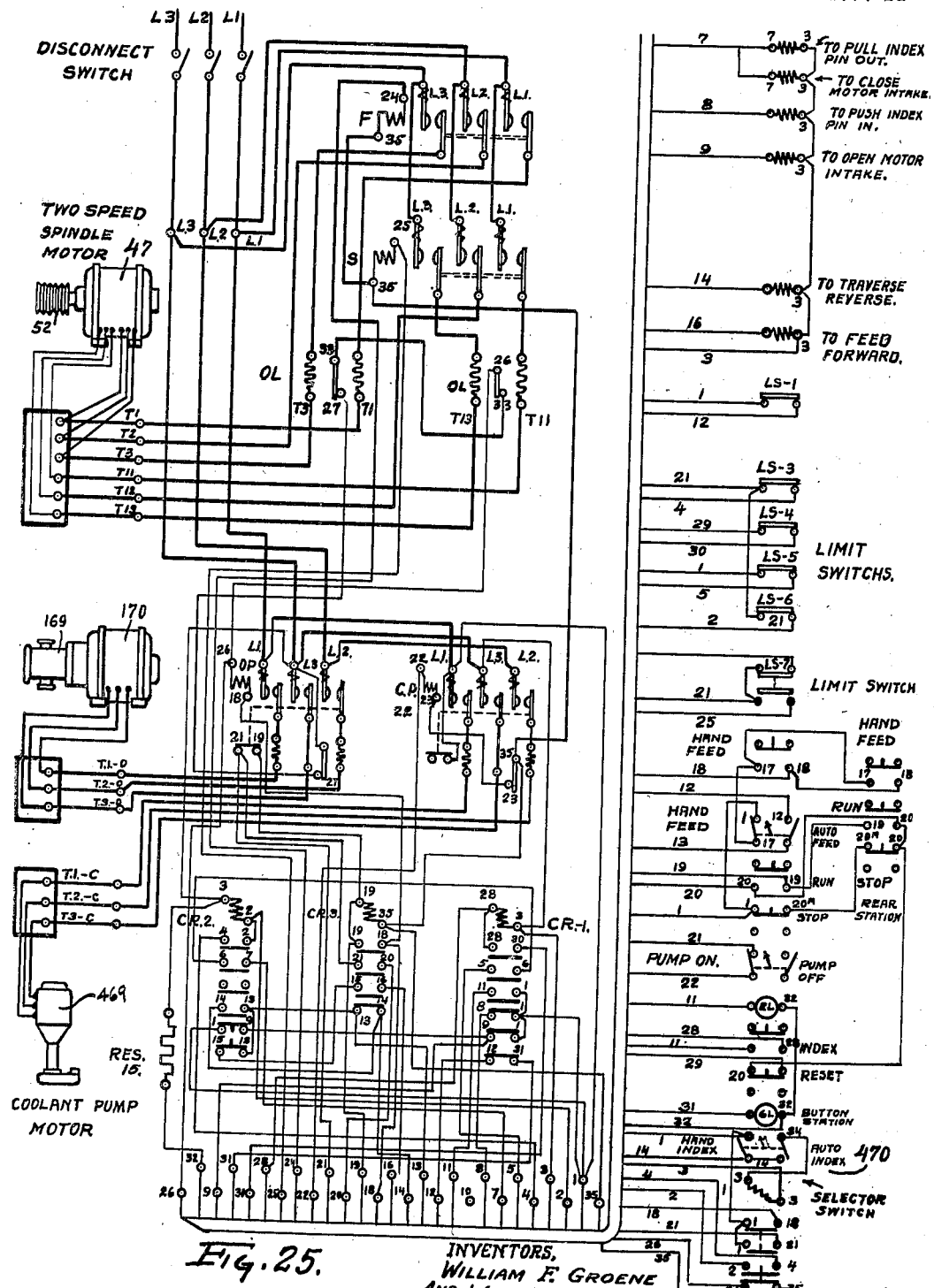

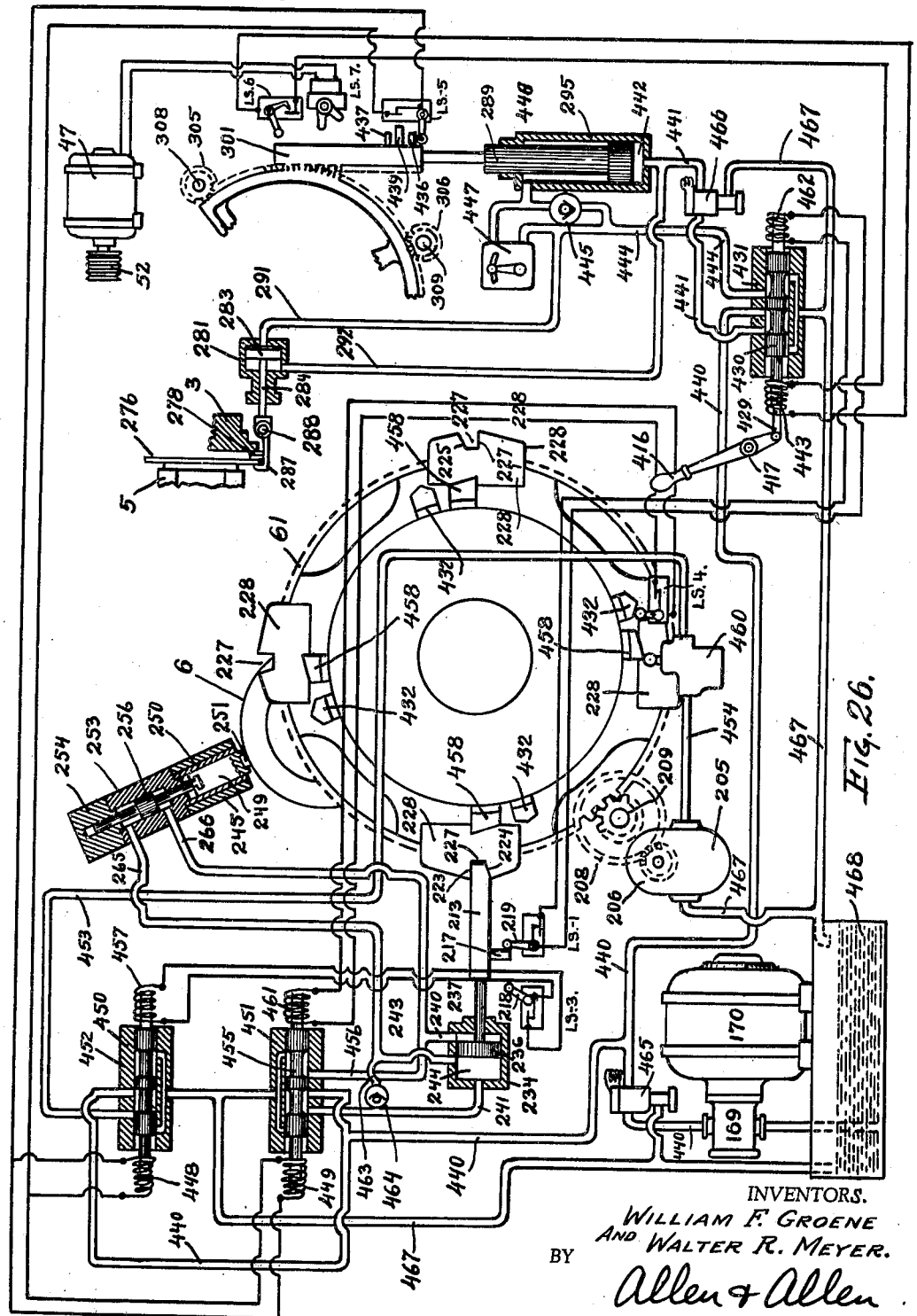

Patented Nov. 29, 1938

2,138,522

UNITED STATES PATENT OFFICE 2,138,522

FOUR-SPINDLE DRUM TYPE CRANKSHAFT LATHE

William F. Groene and Walter R. Meyer, Cincinnati, Ohio, assignors to The R. K. Le Blond Machine Tool Company, Cincinnati, Ohio, a corporation of Delaware Application May 16, 1936, Serial No. 80,204

45 Claims. (Cl. 29—38)

Our invention relates to multiple spindle lathes in which rotating work spindles are carried on a revolving drum or carrier to various predetermined indexed positions at which progressive machining operations are performed on the work by means of cutting tools. For purposes of illustration we show an embodiment of our invention adapted to finish turning all the line bearings and related portions of a crankshaft for an internal combustion engine. It is to be clearly understood, however, that this invention is in no way limited to the particular construction here illustrated and that our invention is well adapted to other classes of work to be machined by means of cutting tools.

Prior to our invention it was the common practice in machining a crankshaft from the rough forging to proceed with the following separate and distinct operations: First, the rough forging was centered and locating pads were milled on the crankshaft webs for properly gripping the work in chucks as illustrated in our issued Patent No. 2,030,020; second, the line bearings and associated surfaces were rough turned in a machine of the character illustrated in copending application, Serial No. 20,220; third, it was necessary to straighten the crankshaft so that the rough turned line bearings would run true when the shaft was rotated, unchucked, on its centers, in order to make possible the rough grinding of the line bearings; fourth, each rough turned line bearing was rough ground so that the shaft might be applied to an orbital lathe of a character illustrated in Patents 1,993,994 and 1,993,995, in which; fifth, all the crank pins were turned simultaneously; and sixth, the flange and stub end diameters and associated surfaces were then either finished before or after the pin turning operation.

The chief objects of our invention are to eliminate costly operations in the above outlined machining procedure, and to increase the accuracy and decrease the spoilage of work by eliminating unnecessary operations and excess handling.

One of the objects of our invention is to eliminate completely the straightening operation above mentioned which was formerly necessary after rough turning the line bearings. This we accomplish by rotating the work while held on its centers, gripping the crankshaft in a chucking device which will not distort the shaft from its normal rotating position on its centers, but which is capable of resisting all deflection which may be set up in the work by the engagement therewith of the cutting tools, and feeding various series of cutting tools in sequence to the crankshaft to true up the bearing portions and associated surfaces and finish machine them to predetermined standard sizes. By means of the above turning method sufficient stock can be left during the rough turning operation to enable truing up the crankshaft. This could not heretofore be efficiently accomplished in rough grinding the crankshaft bearings without the additional straightening operation cited above.

A further object of our invention is to eliminate all rough grinding operations on the main bearings previously required in preparing a crankshaft. We accomplish this by removing a relatively small amount of stock per tool and also by dividing the turning and forming operations up into a series of steps. In our exemplary embodiment we use three machining steps, in such a sequence as to set up a minimum of strain on the cutting tools. Such a process produces a finish and accuracy on the work equal to that of rough grinding. Rough grinding is a much less efficient way of producing the desired finish on the work than our turning process, due to the fact that in grinding only one bearing surface on only one crankshaft can be worked upon at a time, whereas, with our method all the bearing surfaces on several work pieces can be finished simultaneously.

It is also an object of our invention to eliminate the separate operation formerly required to finish the flange and stub end diameters and associated surfaces. With our method this operation is accomplished simultaneously with the finish turning of the line bearings of the crankshaft.

Our machine is also well adapted to machine the line bearings and associated surfaces from a rough forging. In order to give added stability to the work when doing this class of machining, we provide a pair of center drive chucks, utilizing the means and process for gripping the work as fully described and claimed in our Patent No. 2,030,020 issued Feb. 4, 1936. We may also employ a loading device of the character as shown in our Patent 1,700,721 to facilitate handling the work into and out of these center drive chucks.

We provide novel driving means for the spindle center drive chucks, wherein power is delivered to the chucks as they approach and reach the working stations; and also as any individual spindle comes to the loading station it is automatically stopped and braked against further rotation. We also provide a supplementary manual control whereby the work may be caused to rotate or not to rotate at will by operator when it is in the loading station. We prefer to use as the main drive for these chucks a two-speed motor, so that in the initial portion of the cutting cycle a high speed may be used for rotating these chucks, whereas near the end of the cutting cycle, the rotation of the chucks may be reduced to a relatively slow speed, whereby to produce a high degree of finish, free of chatter and vibration marks. We, of course, provide means whereby this change of speed is automatically accomplished at the proper time during the cutting cycle.

Another object of our invention is to provide a suitable rotating drum carrying means for center drive chucks and tailstocks constituting the work spindles. We provide a novel indexing mechanism, hydraulically operated, wherein a hydraulic motor is utilized to rotate the drum and a suitable indexing plunger is synchronized therewith for properly locking the drum carrying means in indexed position. A hydraulic plunger clamp also supplements the first indexing plunger by definitely locking one of more of the center drive chucks so that said chucks are securely held relative to the tool blocks and tools working upon the crankshaft. A supplementary hydraulic clamping means is also provided on the opposite end of the rotating, chuck-carrying drum so as to prevent any twisting or weaving in this drum which might be caused by the action of the cutting tools on the work. A suitable warning device is interlocked with the electrical system so that the machine will not index until the work has been properly chucked and until the operator has manipulated suitable controls.

Another object of our invention is to provide a hydraulically operated mechanical feeding mechanism for the various tools at the different cutting stations. This feeding mechanism comprises means whereby the cutting tools at the various working stations have both a turning action and a facing or forming action. It is also our object to provide feeding means whereby each individual cutting tool has its own distinct rate of feed, independent of any other of the cutting tools at the same work station or at different work stations. Also, we provide means to give the tools a variable feed rate from beginning to end of the cutting cycle. Usually we prefer to start the cutting cycle with a coarse feed and finish the final stages of the cutting cycle with a very fine feed per revolution of the work. We may, however, produce a constant feed for certain of the cutting operations, as for example, for the cutting tools which perform the turning operation, during the entire cutting cycle, and while others of the tools are going through variable feeding functions.

We also provide a novel and simple means for adjusting and setting the individual cutting tools for proper sizing of the work, which can be manipulated without in any way affecting the adjustment of the major part of the feeding mechanism.

The main system of control of the machine consists of electrically-operated hydraulic control means, completely interlocked and safeguarded against improper handling of the machine, and which puts the machine through a complete operating cycle automatically and without attention upon the part of the operator other than to start the machine and load and unload the work.

While in the description to follow we show a specific exemplary embodiment of our invention, it is understood that our invention is not limited to the exact construction here illustrated.

In the drawings:

Fig. 1 is a perspective view of the front of the machine, the electrical control panel being omitted for the sake of clearness.

Fig. 3 is a left hand elevation showing the motor drive, hydraulic pump, and indexing mechanism.

Fig. 4 is a section of the the spindle brake on line IV—IV of Fig. 7.

Fig. 5 is a plan view of the hydraulically operated indexing plunger shown in Fig. 3.

Fig. 6 is a section through the hydraulically operated indexing plunger on the line VI—VI of Fig. 3.

Fig. 8 is a section on line VIII—VIII of Fig. 7.

Fig. 9 is a section on line IX—IX of Figs. 2 and 7.

Fig. 10 is a section on line X—X of Fig. 9.

Fig. 11 is an enlarged view of the ends of the shifter rods shown in Fig. 7.

Fig. 12 is a cross section of the machine on line XII—XII of Fig. 2, showing the relative position of the work spindles and cutting tools during the cutting operation.

Fig. 13 is a section on the line XIII—XIII of Fig. 2 showing the hydraulic plunger clamping mechanism for the center drive chucks.

Fig. 14 is a right hand end elevation showing the feeding mechanism.

Fig. 15 is an enlarged view of the chuck shown in Fig. 12 and the driving means related thereto.

Fig. 16 is a section through a tool holder unit shown on line XVI—XVI of Fig. 22.

Fig. 17 is a section on line XVII—XVII of Fig. 14 showing the drum clamping mechanism.

Fig. 18 is an enlarged front view of the main push button and control station shown in Fig. 1.

Fig. 19 is an enlarged view of the rear push button and control station.

Fig. 20 is a plan view of a forming tool unit assembly.

Fig. 21 is a plan view of the forming tool unit assembly base, the tool blocks being removed.

Fig. 22 is a section through the forming tool unit assembly on line XXII—XXII of Fig. 20.

Fig. 23 is a plan view of the turning tool unit assembly.

Fig. 24 is a section on line XXIV—XXIV of Fig. 23 showing the actuating cam.

Fig. 25 is a circuit diagram of the electrical system.

Fig. 26 is a diagram illustrating the functions and operation of the machine.

General organization

Figure 2:
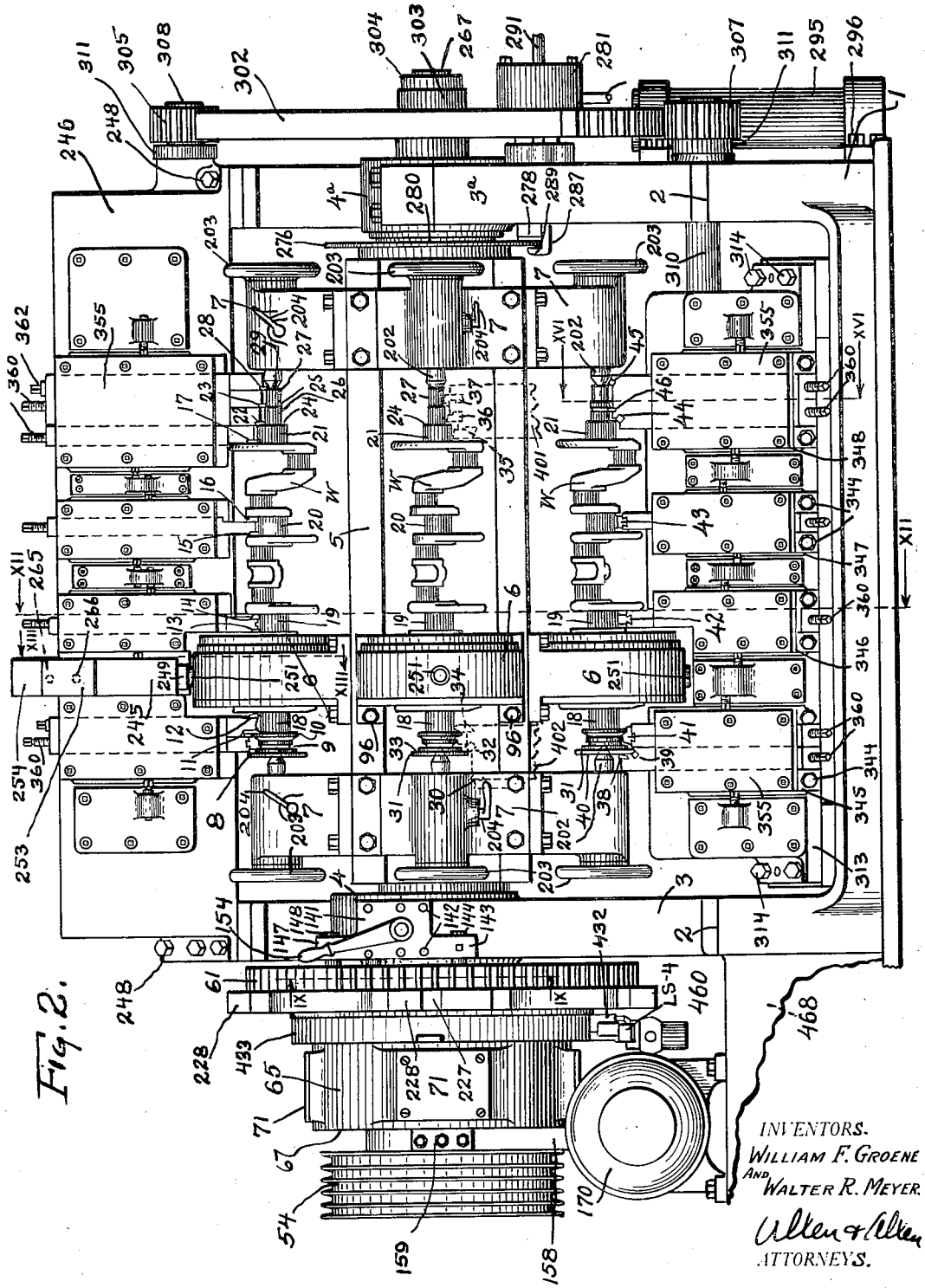
Fig. 2 is a view of the machine in the direction indicated by the arrow II in Fig. 14.

As shown in Figure 1, the machine comprises a base 1 of susbtantially rectangular shape having machined surfaces 2 on top of which are secured upright supports 3 and 3a. The top portions 4 and 4a of these supports are provided with suitable journals which rotatably hold the work spindle carrying and indexing drum 5. On the drum 5 are securely mounted a series of center drive chucks 6 and cooperating centering devices or tailstocks 7 for chucking and rotating work pieces W,—in this particular illustration crankshafts for internal combustion engines.

Referring particularly to Figs. 2 and 12, a fundamental purpose of the drum and associated parts is to index the work pieces carried by the center drive chucks 6 and the centering devices 7 to a series of three work stations designated in Fig. 12, as station one, station two, and station three. A fourth station at which no cutting is done is designated as the loading station and is provided for inserting and removing the work pieces W from the chucking devices 6 and centering means 7. In order to make the construction and operation of our machine more readily understandable, we shall next describe the series of operations at the several stations.

After the work piece W has been loaded in the chucking and centering devices at the loading station, the drum 5 rotates in a clockwise direction as seen in Fig. 12 carrying the work W into properly indexed position for cutting action at station one. It is to be understood that the work crank shaft W which is specifically illustrated in Figs. 1 and 2 has been previously rough machined on the surfaces to be finished by the machine of this invention, the roughing operation being done on a machine of a character shown in Patent 1,934,976, issued Nov. 14, 1933 and in co-pending application Serial Number 20,220.

At station one we provide a series of forming tools adapted to be fed at right angles to the axis of the work piece W. A form tool 8, Figs. 1, 2 and 3, having a very fine feed rate and a relatively short travel, takes a finishing cut on a portion of the oil groove 9 and oil slinger 10 of the crank shaft. A series of tools 11 and 12, 13 and 14, 15 and 16, and 17 finish the faces of the fillets and narrow portions of the diameters of the respective line bearings 18, 19, 20, and 21 to proper size for finish grinding. These tools feed at a relatively high rate while facing the fillets but have a relatively low rate of feed when turning on the narrow diameters of the line bearings. Tools 22 and 23 face the shoulders 24 and 25 of the respective stub end portions 26 and 27 and neck these shoulders for the finish grinding operation. The tool 28 finish faces the end 29 of the shaft to proper length. The tools just described all have different rates of feed relative to each other and each has a feed variation of its own commensurate with the nature of the surface it is machining on the work W. All the tools finish up their cutting action substantially at the same time so that a minimum of time is consumed while providing maximum cutting efficiency for the tools.

After completing the forming operation at station one as described above, the drum 5 indexes again to bring the work W to cutting position at station two. Here turning tools are brought into working position which feed longitudinally of the axis of the work, to the left as seen in Fig. 2. Tool 30 finish turns the diameter of the flange 31. Tool 32 turns and necks the flange bolt circle 33 to proper finish turned size. Tool 34 finish turns that portion of the line bearing 18 which is between the narrow finished diameter produced by the tools 11 and 12 at station one. Tool 35 finish turns the line bearing 21 from the shoulder 24, matching the cut with the narrow turned diameter produced by the tool 17 of station one. It is to be clearly noted that the turning tools 34 and 35 produce a surface with a finish and accuracy equivalent to rough grinding and with a uniformity for each piece sufficiently precise to permit chucking the work piece in chucking devices and utilizing a process as set forth in Patents 1,878,130, Re. 19,730, and copending application Serial Number 756,727 without requiring any additional machining or straightening operations on these surfaces. The tools 36 and 37 finish turn the stub end portions 26 and 27 for finish grinding operations.

Upon completion of the turning operations at station two the drum 5 again indexes and brings the work to cutting position at the final work station three, where, again, forming tools operate upon the work W, feeding at right angles to the axis of the work W. The tool 38 finish faces the outside 40 of the flange 31 to proper length while the tool 39 chamfers the outside edge of the flange 31, these two tools having a relatively long travel and rapid rate of feed. The form tool 41 feeds at a relatively slow rate and completes the machining necessary on the flange end oil groove 9 and oil slinger 10. Form tools 42 and 43 feed at a relatively slow rate to produce the required finished surface on the line bearings 19 and 20 respectively, which lies between the respective narrow diameters finished by tools 13 and 14, and 15 and 16 at station one. These bearings 19 and 20 are finished to an accuracy commensurate with that produced on the bearings 18 and 21 just described so that steady rests, of a character shown in Patent 1,906,577, may be used in conjunction with the chucking devices and method of chucking outlined in the patents already cited above. Tools 44 and 45 finish chamfer the stub end shoulders 24 and 29 while the tool 46 forms an oil groove in the stub end diameter 26.

The work is revolved at a relative high cutting speed during the first cutting operations at each station, but may subsequently be revolved at a relatively slow cutting speed during the final cutting operations at each station. This slowing down of the work spindles during the last stages of the cutting operation of the tools produces a very high degree of finish and accuracy free from all chatter marks and undesirable surface imperfections.

It will be noted that we provide means for automatically maintaining predetermined uniform rates of feed for the various tools when the spindle speed is changed.

It is to be clearly understood that this turning method is also well adapted to machining crank shafts from the rough forging. For instance, it is well within the scope of our invention to add one or more machining stations to the above outlined procedure for the preliminary roughing of a work piece. Also we might utilize two or more center drive chucking devices 6 involving a chucking method outlined in Patents 1,843,359, 1,934,976, and 2,030,020. We might also incorporate a loading device as illustrated in our Patent 1,700,721 to facilitate loading work in these center drive chucks.

Having now set forth the process by which we contemplate finish turning crank shafts we will now proceed to describe in detail the means utilized for carrying out this process.

*Drive for work spindles*

Figure 7:
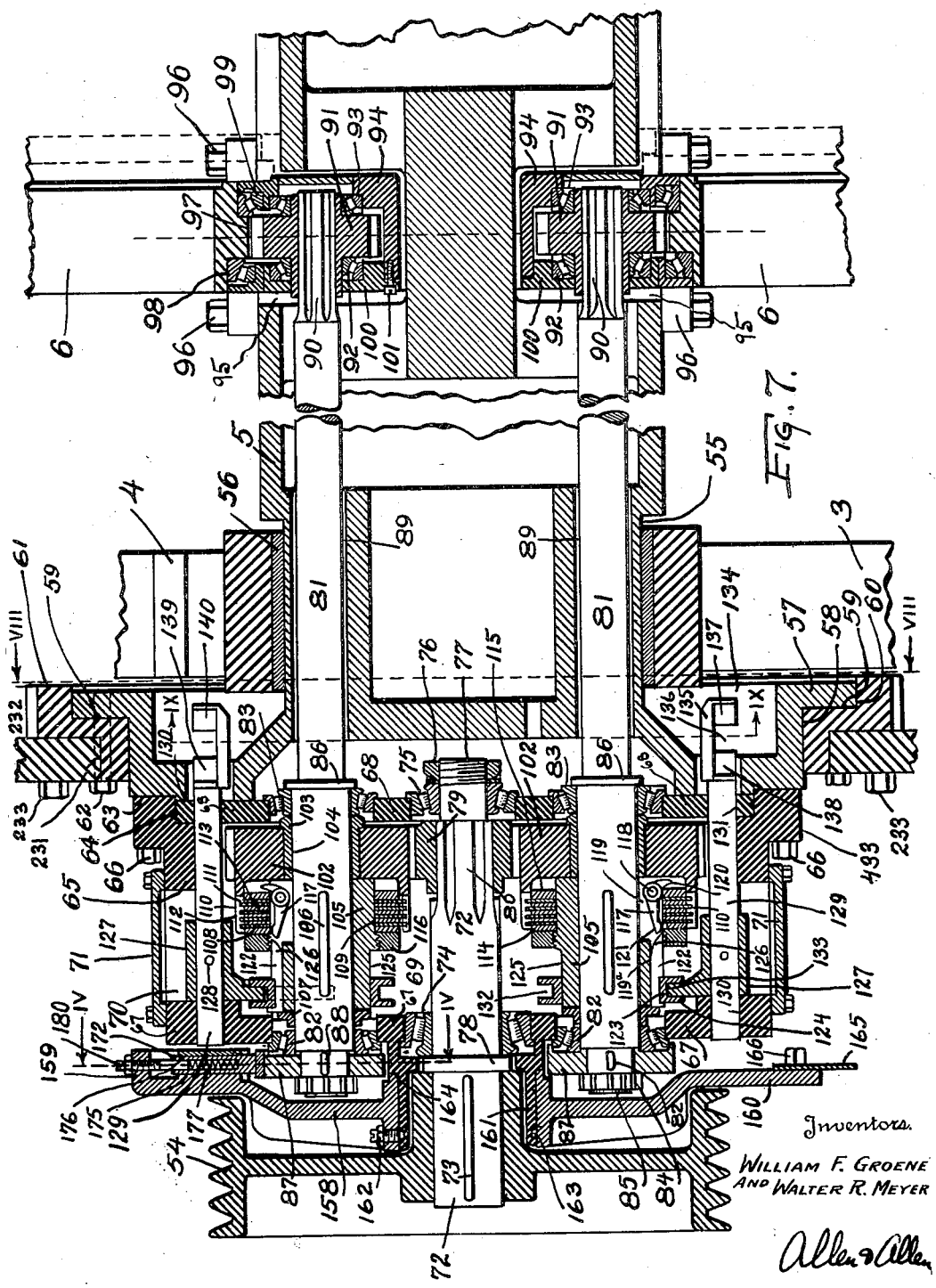
Fig. 7 is a section through the spindle drive mechanism on line VII—VII of Fig. 3.

Referring particularly to Figs. 3 and 7, the main driving power for rotating the center drive chucks 6 is derived from a two speed electric motor 47 carried on a pivoting bracket 48 attached to the rear of the base 1 by a pivotal connection 49, adjusting means 50 being provided. V-belts 51 transmit the power from the motor pulley 52 fixed on the motor shaft 53 to the main driving pulley 54. By adjusting the means 50 just described proper belt tension is maintained for the driving belts 51.

In Fig. 7 it can be seen that the drum 5 has a bearing surface 55 capable of being rotated in a suitable bearing bushing 56 carried in the journal 4 of the support 3. The left end extension of the drum 5 beyond its bearing 55 forms a flanged portion 57 having finished surfaces 58, 59, and 60 concentric with the axis of rotation of the drum 5 and which carry the indexing ring gear 61 fixed to these surfaces by suitable means 62. The function of this gear 61 will be described later under the indexing mechanism.

The surfaces 63 and 64 of the flange 57 locate the spindle control housing 65 which is fixed thereto by suitable bolting means 66. This housing 65 has an outer web 67 formed integral therewith and an inner web member 68 attached thereto which provide supports for the bearings of the various driving shafts. A suitable cavity 69 formed between the webs 67 and 68 in the housing 65 provides space for the accommodation of the driving gears, clutches, and clutch operating mechanism associated with the work spindles. A series of openings 70, in the housing 65, which are closed by suitable removable covers 71, provide access for making adjustments to the several clutches.

Describing the mechanism in the housing 65 in detail, and with continued reference to Fig. 7, it is to be noted that the main driving pulley 54 is made fast to a stub shaft 72 and keyed securely thereto by suitable means 73. The stub shaft 72 is journaled on the axis of rotation of the drum 5 on a tapered roller bearing 74 carried in web 67 and on a bearing 75 carried in web 68. A lock nut 76 threaded to the right hand end 77 of the shaft 72 provides means for taking up the bearings 74 and 75 and shaft 72 against an integral shoulder 78 on the shaft, in order to prevent axial motion thereof. A pinion 79 is securely fastened to this shaft 72 by a suitable tightly fitting splined connection 80.

A series of propeller shafts 81 equal in number to the number of work spindles (in this illustration four) are provided, to drive the four center drive chucks 6, and are located parallel with and equally radially spaced from the axis of rotation of the drum 5. These shafts 81 are journaled in suitable tapered roller bearing 82 in the web 67 and bearing 83 in the web 68. A lock nut 84 threaded to the end 85 of shaft 81 provides means for taking up the bearings 82 and 83 against an integral shoulder 86 of the shafts, and prevents axial movement of these shafts. A brake drum 87 is keyed to the shaft by suitable means 88, the drum 87 being so fitted to the end 85 of the shaft that it is free to move axially thereof when the lock nut 84 is being adjusted.

As can be clearly seen in Fig. 7, the shafts project beyond their respective bearings 83 through suitable clearance openings 89 in the end bearing portion 55 of the drum 5, and have splined connections 90 within driving pinions 91 for the center drive chucks. Each pinion 91, which is free to slide axially on the splined connection 90, is journaled between two suitable tapered roller bearings 92 and 93 carried in the center drive chuck housings 94 of the center drive chucks 6. Suitable cavities 95 are provided in the drum 5 to accommodate the portion of the center drive chuck housings 94 which carry this driving pinion assembly. Such construction permits easy setting of the center drive chucks 6 axially of the drum 5 prior to finally bolting these chucks 6 securely to the drum 5 by suitable means 96.

Each pinion 91 meshes with the center drive chuck ring gear 97 which is also journaled in suitable tapered roller bearings 98 and 99 held in the chuck housing 94. Suitable retaining means 100 secured by screws 101 provide means for keeping the bearings 92, 93, 98, and 99 properly adjusted, and prevent entrance of foreign matter.

Upon each of the propeller shafts 81 are mounted clutch gears 102 meshing with the pinion 79 on the stub shaft, and having bushings 103 pressed therein. Thus these gears are free to rotate on their bushings on suitable bearing surfaces 104 on the shafts 81. A clutch sleeve 105 is keyed to the shaft 81 by suitable means 106, and is free to slide axially of the shaft 81 for purposes of easy assembly of the shafts 81 in the housing 65. In order to prevent substantially all axial movement of the gear 102 and the sleeve 105 on the shaft 81 a collar 107, carried on the shaft between the bearing 82 and the sleeve 105, is fitted so as to take up substantially all of the remaining space between the bearings 82 and 83 after the gear 102 and sleeve 105 have been assembled on the shaft, the collar 107 being so fitted, however, as not to prevent the proper adjustment of the bearings by the lock nut 84 as described.

A conventional multiple-disc clutch is provided on the sleeve 105 comprising a series of steel plates 108 which are free to rotate on the portion 109 of the sleeve 105, and which have projections 110 arranged in driving engagement with mating slots 111 in an integral projecting ring 112 on the gear 102. A series of composition material friction discs 113, free to rotate on the diameter 109 of the sleeve 105 are interleaved between the steel discs 108 but do not engage the portion 112 of gear 102. Two pressure plates 114 and 115 confine the series of discs 108 and 113 within proper operating limits. A threaded adjusting nut 116 carried on the sleeve takes the thrust applied to the pressure plates and discs by the clutch operating fingers 117 pivotally carried on suitable means 118 in slots 119 in the sleeve 105. The nut 116 provides means for adjusting the pressure applied to the clutch plates 108 and 113 when the shorter ends 120 of levers 117 engage the pressure plate 115, at which time the longer ends 121 have been moved radially toward the axis of the shafts 81, thus clamping the steel discs 108 in driving relation with the shaft 81 through the means just described.

In order to actuate these multiple disc clutches a series of axially sliding keys 122 are slidingly fitted in longitudinal slots 119a provided in the sleeve 105, and are engaged and moved by projections 123 of a shifter ring 124 which can be moved axially on the bearing surface 125 of sleeve 105. It can be clearly seen in Fig. 7 that the keys 122 have rounded portions 126 and that when these keys are moved to the right the portions 121 of levers 117 will be moved radially toward the axis of shaft 81 and thereby cause clamping action in the portion 120 by the means described. As the keys are moved to the left, the pressure is released.

We provide means for actuating these clutches automatically in such a manner that, as any particular work spindle enters the loading station, upon the turning of the drum 5, the clutch connecting the driving power to the center drive chuck of this particular spindle is automatically disengaged; further, upon being indexed out of the loading station to station one, the clutch is automatically reengaged, and so on throughout a cycle including all stations. To accomplish this result we provide a shifter yoke 127 securely fixed by suitable means 128 to an axially movable shifter rod 129 carried in a bearing 130 in web 67 and in a bearing 131 in web 68. The yoke 127, of the usual forked construction, has a running fit in the annular groove 132 of the shifter ring 124, the portion of the yoke bearing in the bottom of the slot 133 preventing the yoke 127 and the shaft 129 fixed thereto from rotating around the axis of the shaft 129.

An annular groove 134 is provided as shown in the flanged portion 57 of the drum 5 into which project the squared ends 135 of the shafts 129. The construction of these ends 135 is somewhat more clearly shown in Fig. 11 wherein a transverse slot 136, facing radially outward from the axis of drum 5, is provided in this squared portion, and has beveled sides 137, 138, 139 and 140.

Noting particularly Figs. 8, 9, and 10, a bracket 141 is suitably secured to the left hand housing 3 as by bolts 142. A lower projection 143 has fixed to it a stud 144 on the end of which is mounted a roller 145 by means of stud 146 which projects radially inward toward the axis of rotation of the drum 5. An upper projection 147 of the bracket 141 has fixed to it a stud 148, somewhat shorter than stud 144, on which is mounted a roller 149 by means of a stud 150 which likewise projects radially inward toward the axis of rotation of the drum 5. The rollers 145 and 149 are so located relative the squared ends 135 of the rods 129 that they pass through the slot 136, which is just slightly larger than the rollers, as the rods 129 are carried about the axis of the drum 5 during the rotation thereof. Normally in the operation of the machine, the work spindle at the loading station is stopped and its shifter rod is to the extreme left position as seen in Fig. 7. As the drum 5 is indexed and this spindle leaves the loading station, the beveled side 137 of the slot 136 engages the fixed roller 149 whereupon the rod 129 is moved axially to the right, thus engaging the multiple-disc clutch with the driving means for rotating the center drive chuck 6 of this spindle. Upon being indexed out of station three the beveled side 138 of the slot 136 engages the fixed roller 145, which roller is positioned further to the left than the first mentioned roller 149, whereupon the rod 129 is moved to the left, disengaging the clutch and stopping the chuck 6 of the spindle as it again enters the loading station. All of the above functions are accomplished automatically without attention upon the part of the operator.

A manual control for starting or stopping the work spindle which is in the loading station, for purposes of jogging the chuck in loading or unloading the work, is provided by means of an axially adjustable plunger 151 (Fig. 10) carried in the bracket 141. This plunger has a roller 152 carried on a stud 153 positioned in a like manner to that of rollers 145 and 149. The plunger 151 is so located that when the drum 5 is locked in indexed position, the squared end 135 of the spindle in the loading station will be positioned in such a way that the roller 152 will be in the slot 136. Hence, as the plunger 151 is moved axially, the rod 129 of this spindle will likewise be moved and will operate the multiple disc clutch to start or stop this spindle at the will of the operator. A spindle start and stop lever 154, conveniently located at the front of the machine, is carried on a rock shaft 155 in the bracket 141. This shaft has a pinion 156 meshing with a rack 157 cut in the plunger 151 as clearly shown in Figs. 9 and 10, so that as the lever is moved to the left, as seen from the front of the machine, the spindle in the loading station will be stopped. When the lever is moved to the right the spindle will be started. Beveled sides 139 and 140 are also provided for the squared ends 135 so as to prevent damage to the clutch rods 129 and rollers 145, 149, and 152 in the event it is desired to index the drum 5 in the reverse direction from that of normal operation, if, for example, the tools should become jammed in the work.

An automatically operated device is provided for stopping spindle rotation as the driving clutch is released at the time the spindle enters the loading station. Referring particularly to Figs. 3, 4 and 7, a bracket 158 having angularly related arms 159 and 160 is journaled at the intersection of the arms on an extension 161 of the web 67. A set screw 162 threaded in the bracket 158 loosely engages an annular slot 163 confining the bracket between the slot 163 and the shoulder 164 of the extension 161. The arm 160 has a block 165 secured thereto by means of bolts 166 which block is secured to any fixed portion of the base of the machine. In the particular illustration of Fig. 3 the block 165 is held for convenience between the faces 167 and 168 of the fluid pressure pump 169 attached to and directly driven by the motor 170 fixed to the base 1 by suitable bolts 171. In the arm 159 is carried a sliding block 172 confined between finished surfaces 173, 174, 175 and 176 of the arm so that the block is free to move radially of the axis of the drum 5. Springs 177 carried in holes 178 in the block 172 yieldingly force the block toward the axis of drum 5 when set screws 179 threaded in the arm 159 are screwed down upon the springs 177 in the holes 178. A stud 180 fixed to the block 172 by suitable threaded connection 181 passes through a clearance hole 182 in the arm 159 and has suitable lock nuts 183 threaded thereon which are adapted to engage the surface 184 of the arm 159, the purpose of which is to provide means for adjustably limiting the radially inward extension of the block 172 when not performing braking action now to be described.

The radially inwardly positioned face of the block 172 has a brake shoe 185 fixed thereto, which shoe has a curvature conforming to the curvature of the brake drum 87 fixed on the shafts 81 for each work spindle. The center of the radius of curvature of the brake shoe 185 coincides with the center of the shaft 81 when the particular spindle associated therewith is in the loading station, the shoe 185 being urged radially toward the axis of the brake drum 87 by the springs 177 as described. The action of the automatic braking mechanism is clearly shown in Fig. 4. The drum 5, in indexing clockwise, first carries the brake drum 87 into contact with the end portion 186 of the brake shoe 185 just as the particular spindle associated therewith is about to enter the loading station. The continued movement to indexed position of the drum 5 causes the block 172 to be raised against the pressure of the springs 177, thus lifting the lock nuts 183 from contact with the surface 184. Upon reaching exact indexed position the block 172 again is lowered automatically by the spring 177 but not far enough to allow lock nuts 183 to contact surface 184, the brake shoe 185 slidingly engaging the surface of the brake drum 87 to cause frictional contact therewith. This prevents rotation of the shaft 81 and the center drive chuck 6 when the multiple disc clutch is released. The braking arrangement is always in operation when a particular spindle is in the loading station but its braking power is not sufficient to prevent rotation of the spindle when its particular multiple disc clutch is engaged. As the particular spindle in the loading station is indexed to station one, the brake drum 87 passes out from under the shoe 185 past the end 187, raising block 172 and allowing it to again return downward with the lock nut 183 supporting the block 172 against surface 184. It can be seen that this braking means for the spindle when in the loading station becomes effective and is released automatically, without attention upon the part of the operator during the operating cycle of the machine.

*Chucking and centering*

The method of chucking the crank shaft is shown in Figs. 1, 12, and 15, particularly Fig. 15 wherein we illustrate a typical arrangement utilizing the principles fully described and claimed in Patent 2,030,020 issued Feb. 4, 1936, which comprises providing a set of angularly related locating surfaces 188, 189, 190, and 191, fixed to the chuck ring gear 97 which engage mating finished surfaces of the work piece W so as to locate the work W in definite centered, indexed, and driving relation to the ring gear 97. A suitable clamping means is provided for holding the work in engagement with these locating areas comprising a clamp bar 192 pivotally connected to the ring gear 97 by means of a suitable pin 193 fixed in the ring gear 97 and a latch 194 pivotally connected to the ring gear by a suitable pin 195 fixed in the ring gear 97. The latch 194 has a slotted opening 196 into which enters a projecting lug 197 of the clamp bar 192 when the clamp and latch are swung to clamping position, a set screw 198 in the latch provides means for binding the latch on the clamp. In the clamp bar there is provided a main clamping anvil 199 which bears against a portion of the work to hold it against the locating areas 188, 189, 190, and 191. In addition to this anvil 199 we may also provide, in the clamp bar 192, adjustable means 200, fixed when adjusted, which contacts the work on either side of the anvil 199 and which precludes any possibility of the work piece being dislodged from centered or indexed position under the action of the cutting tools. A suitable clearance 201 is provided in the chuck ring gear 97 to permit endwise loading and unloading of the work through the chuck 6 when the clamp 192 and latch 194 are swung radially outward of the chuck.

Endwise location of the work piece in the chucks 6 (see Fig. 23) is provided by the usual center pins 202 engaging center holes in the ends of the work. The center pins 202 are carried on the axis of rotation of the chucks 6 in suitable center housings or tailstocks 7 fixed to the drum 5; and are capable of being adjusted axially by means of a handwheel 203 in a conventional manner as used in tailstocks for lathes. A clamping handle 204 provides operating means for holding the center pins 202 in adjusted position.

*Indexing mechanism*

The mechanism for rotating the work spindle carrying drum 5 to the respective indexed positions of the various work stations and the loading station comprises a fluid pressure driven motor 205, Fig. 3, suitably fixed to the base 1 of the machine, having a driving pinion 206 secured to its power output shaft 207. A compound gear, comprising the large gear 208 meshing with the motor pinion 206 and the small gear 209 meshing with the indexing ring gear 61, is suitably journaled in a supporting stud, not shown, attached to the left hand housing 3, which arrangement afford the means whereby the fluid motor 205 is adapted to revolve the drum 5.

A fluid pressure operated indexing plunger mechanism is provided for definitely positioning the drum 5 and work spindles carried thereon in proper position relative to the cutting tools and work loading position, this mechanism being interlocked with the operation of the fluid motor 205 in a manner to be described later. Referring particularly to Figs. 3, 5, and 6, a bracket 210 is fixed to the left hand support 3 by bolting means 211. In a slot 212 is snugly fitted the indexing plunger 213 so that it may be reciprocated radially relative to the axis of the drum 5. A cover plate 214 is secured to the bracket 210, to hold the plunger 213 properly in place, by screws 215. An elongated slot 216 extending longitudinally of the plunger 213 is formed in the cover plate 214 in which a pin 217 fixed in the plunger 213 can reciprocate upon movement of the plunger 213 and which pin actuates the switch arms 218 and 219 of the limit switches LS—3 and LS—1 carried on brackets 220 and 221 attached to the cover plate 214 by suitable bolts 222. The function of these limit switches LS—3 and LS—1 will be described later under the control and operation of the machine.

The indexing plunger 213 has its projecting end provided with a face 223 parallel to the direction of its reciprocation and another face 224, transversely opposite the face 223, which is angularly related to the direction of motion of the plunger 213. These faces 223 and 224 engage respective surfaces 225 and 226 of the indexing slots 227 in the blocks 228 which are fitted snugly between the faces 229, 230, 231 and 232 of the gear 61 and are securely bolted to this gear 61 by suitable bolting means 233. The faces 225 of the indexing blocks 228 are machined in predetermined, accurately indexed positions. The wedging action caused by the coaction of the face 224 of the plunger 213 and the face 226 of the block 228 automatically forces the face 225 against the face 223 of the plunger 213 when the plunger is forced into the slot 227.

The means for reciprocating the indexing plunger 213 comprises a hydraulic cylinder 234 secured to the bracket 210 by bolting means 235, which cylinder accommodates a piston 236 having a rod 237 passing through the usual packing gland 238 and attached to the indexing plunger 213 by suitable threaded means 239 in the inner end of the plunger. Two main pipe lines 240 and 241 connect respectively to the cylinder 234 and the cylinder head 242 for applying fluid pressure to reciprocate the piston 236 and the indexing plunger 213 attached thereto. A third pipe line 243 also connects to the cylinder 234 in such a position that it is only open to the cylinder chamber 244 at the time when the index plunger 213 has substantially entered into the slot 227. The function of the pipe line 243 will be described under the control and operation of the machine.

An additional indexing and steadying device is afforded the drum 5 by providing a plunger clamp shown in Figs. 2, 12, and 13, wherein a bracket 245 is fixed on the tool holder support 246 of station one, by bolts 348a which support is in turn suitably fixed to finished areas 247 of the upright supports 3 and 3a by suitable bolting means 248. The bracket 245 is so located on the support 246 that plunger 249, slidingly carried in the sleeve 250 fixed in the bracket, is adapted to engage a conical plug 251 fixed on the housing of the center drive chuck 6, which plug 251 fits snugly in the mating tapered hole 252 in the plunger 249 when the drum is in a proper index position. The means for axially reciprocating the plunger 249 comprises a cylinder 253 and a cylinder head 254 bolted together by suitable means 255 to the bracket 245. A piston 256 has a rod extension 257 sliding in a bearing 258 in the cylinder 253, which rod is secured to the plunger 249 by suitable means 259. The piston 256 also has a rod extension 260 sliding in a bearing 261 in the cylinder head 254. A vent hole 262 is provided in the cylinder head to prevent oil becoming trapped in the space 263 in the cylinder head 254. Oil leakage past the rod extension 257 in bearing 258 enters chamber 264 lubricating the plunger 249 sliding in bushing 250. Pipe lines 265 and 266 provide means for applying fluid pressure for reciprocating the piston 256 and plunger 249.

It is to be clearly understood that while we show a specific embodiment of this chuck clamping mechanism applied to only a single chuck 6 at a time and at only one cutting tool station, it is also within the scope of our invention to provide such a clamping, steadying, and indexing device to a chuck at each cutting tool station or to a series of chucks at each of several cutting tool stations. For instance, we might provide a pair of center drive chucks 6 for each work spindle and a pair of said clamping devices at each of the three work stations so that a pair of chucks 6 would be clamped and steadied at each of the stations during the machining cycle, such an arrangement being especially valuable when machining work from rough pieces.

A clamping and steadying device is also provided for the right end of the drum 5, as viewed from the front of the machine. Referring to Figs. 1, 2, 14 and 17, particularly Fig. 17, the right end of the drum 5 has an integral bearing extension 267 which is free to revolve in suitable bushings 268 and 269 fixed in the journal 4a of the right hand housing 3a. A flanged portion 270 of the bearing 267 having a thrust collar 271 attached thereto has a running contact against the face 272 of the right hand journal 4. An adjustable lock nut 273 is threaded to the outer end of bearing 267 so that it may be advanced axially thereof to move the thrust collar 274 against the face 274a of the right hand journal 4a. This arrangement provides means whereby a nice running fit can be maintained between the faces 272 and 274a and the respective thrust collars 271 and 274 which substantially eliminates all axial movement in the drum 5, in spite of the effect of the checking operations of the tools upon the work piece W.

On the drum 5 is securely fastened a clamping disc 276, concentric with the axis of the drum 5, by suitable bolting means 277. A block 278 secured to the right hand housing 3 by screws 279 is arranged so that it very lightly slidingly contacts the face 280 of the disc 275 when the drum 5 is being indexed. A fluid pressure cylinder 281 is securely held on the right had housing 3 by bolts 282 and has a reciprocatable piston 283 with a rod 284 passing through the usual packing gland 285. On the outer end 286 of the rod 284 is pivotally mounted the clamping latch 287 by a suitable pivotal connection 288. A transverse projecting portion 289 of the latch 287 extends over the face 290 of the disc 275 and securely binds the disc 275 against the block 278 when the rod 284 and piston 283 are withdrawn to the right. In Fig. 17 the disc is shown unclamped with the rod 284 and piston 283 extended to the left as when the drum 5 is indexing. Pipe lines 291 and 292 provide means for applying fluid pressure for reciprocating the piston 283 in proper sequence with the indexing operation in a manner to be described later under the control and operation of the machine. A set screw 293 carried in a block 294 in the right hand housing 3 provides means for properly positioning the latch 287 relative to the disc 275 and the block 278.

*Tool feeding mechanism*

The driving power for moving the tools to and from the work W is derived from the directly driven fluid pressure pump 169 connected to the electric motor 170, which supplies pressure to the vertically positioned feed cylinder 295 fastened to the base 1 and the right hand support 3a by bolting means 296 and 297 respectively, Figs. 3 and 14. Attached to the reciprocable piston rod 298 of the cylinder 295 by suitable connecting means 299 is a rack 300, slidingly carried in a suitable guide 301 on the right hand support 3a, which meshes with a relatively large segmental gear 302, whereby this gear may be rotated in either direction by reciprocation of the rack 300 and piston rod 298 by properly applying fluid pressure to the cylinder 295.

Referring particularly to Fig. 17, the segmental gear 302 is pivotally mounted on the bearing portion 303 which is an integral part of the bearing portion 267 of the drum 5 and which is concentric with the axis of the drum 5. A collar 304, secured to the bearing portion 303, prevents axial movement of the gear 302 on the bearing portion 303. Meshing with the segment gear 302 (Fig. 14) are pinions 305, 306, and 307 securely fixed to the respective cam shafts 308, 309, and 310, for each cutting tool station. The ends of the cam shafts having the pinions attached thereto are supported in suitable bearing brackets 311 fixed to the right hand housing 3a by suitable bolting means 312.

In the particular machine illustrated, the cutting tool station one and station three have tools which are fed radially to and from the axis of rotation of the work to perform forming and facing operations thereon. Station two has tools which are adapted to feeding longitudinally of the work piece for performing turning operations on the work piece as previously described.

Since the cutting tools of stations one and three operate in substantially the same manner it will suffice to describe the operating mechanism of one of these stations as being representative of both stations. Referring particularly to Figs. 16, 20, 21, and 22, we here illustrate the mechanism for actuating the tools of station three. A tool holder support 313 is bolted to the base 1 of the machine by suitable means 314. The cam shaft 310 is journaled in suitable bearings 315 and 316 fixed in the support 313. A cylindrical cam 317 having a helical groove 318 is fixed to the shaft 310 between the bearings 315 and 316. Suitable anti-friction thrust bearings 319 and 320, fitting nicely between the end faces 321 and 322 of the cam 317 and the faces 323 and 324 of the respective bearings 319 and 320, provide means for rotatingly supporting the shaft 310 without axial motion.

A cam plate 325 is slidingly carried in a slot comprising the guides 326, 327, and 328, which extend longitudinally of the support 313 and parallel to the axes of the drum 5 and work spindles. A roller 329 carried on a stud 330 fixed to the cam plate 325 by suitable means 331 operates in the helical slot 318 of the drum cam 317 in such a way that as the pinion 307 on the cam shaft 310 is rotated in either direction by the means already described, the cam plate 325 can likewise be reciprocated in either direction in the guides 326, 327 and 328. In the slot comprising the longitudinal surfaces 332, 333, and 334 of the cam plate 325 are bolted the various cams 335, 336, 337, 338, 339, 340, 341, and 342 by suitable means 343. Bolted to the support 313, by means 344, are the several tool holder blocks 345, 346, 347, and 348 in which are slidingly carried in suitable guides 354, the respective tool holders 349, 350, 351, 352, and 353. Top cover plates 355 secured to the blocks by screws 356 hold the tool holders in snug sliding condition in the blocks. Each tool holder has a cut away portion 357 which accommodates a block 358 which block is confined between the guides 354 and the surface 359 of the cut away portion 357 of the tool holder. The block 358 is made shorter than the cut away portion 357 so that movement may be produced along the length of the tool holder and the block 358.

The means for adjusting the block 358 relative to the tool holder 353 comprises a set screw 360 threaded in the tool holder 353 (Fig. 16), which abuts against a suitable surface 361 of the block 358, and a screw 362 threaded in the block 358 by suitable means 363, the screw passing through an opening 364 and having a flanged portion 365 abutting against the surface 366 provided at the rear of the tool holder 353. It can be clearly seen that by advancing screw 360, the tool holder 353 and its tool 44 are moved relative to the block 358 so that the tool 44 is withdrawn from the axis of the work W. Also, when screw 362 is advanced, the tool holder 353 will be moved relative to the block 358 so that the tool 44 is moved toward the axis of the work W. Both screws may be so adjusted as to bind the tool holder in any relative position of the block 358 and holder 353. By this arrangement we provide means for adjusting each individual tool for proper sizing of the work, which means can be fixed when adjusted and is in no way affected by the adjustment of the other tools.

The relative position of the block 358 and the axis of the work piece W' is determined by the contact of the roller 367 carried on a suitable stud 368 fixed in the block 358 and the surfaces 369 and 370 of the various cams 335, 336, 337, 338, 339, 340, 341, and 342. It can be seen that as the cam plate 325 carrying these cams is reciprocated as described that the angularly positioned faces 369 and 370 of the cams will co-act with the roller 367 and cause reciprocation of the tool holders 353 and tools 38, 39, 41, 42, 43, 44, 45, and 46 in the tool blocks 354 so as to feed the tools radially of the work piece W.

By arranging cams on the cam plate having different degrees of angularity to the path of cam plate travel, different rates of feed can be provided for each individual tool or group of tools at any work station. For example, the angularity of the cam 335 for actuating the tool 38 to produce a long facing cut on the flange 31 of the crank shaft is made relatively great. The forming tool 41 which must perform a difficult forming operation on the oil groove 9 and oil slinger 10 of a crank shaft is actuated by a cam 336 having a relatively slight degree of angularity. The form tools 42 and 43 may require cams 337—338 and 339—340 of moderate degrees of angularity as may also the group of tools 44, 45 and 46, which are actuated by cams 341 and 342. By this arrangement, we can also provide variable rates of feed by suitably shaping the cams with varying degrees of angularity. We can also retain a constant rate of feed when the spindles are changed from high to low speed by arranging the change of angularity of the cams so as to compensate for the change of spindle speed at the time of such spindle speed change. Also by providing lands or portions of the cams parallel to the cam plate travel, a dwell can be produced for the tools for finish sizing the work and removing all surface defects.

The mechanism for actuating the turning tools of station two, Figs. 23 and 24, is arranged as follows: The cam shaft 309, journaled in the bearing bracket 311 and having the pinion 306 attached thereto as stated, passes longitudinally through the tool holder support 371 and is journaled therein in suitable bearings 372, 373, 374, and 375. Anti-friction thrust bearings 376 and 377 are held properly adjusted against faces 378 and 379 of bearing 375 and against shoulder 380 of the shaft 309 by suitable lock nut arrangement 381 threaded to the shaft 309, preventing substantially all axial motion of shaft 309. Secured to the shaft 309 are drum cams 382 and 383 located between the bearings 372 and 373 and the bearings 374 and 375 respectively, the cams being provided with helical slots 384 and 385. Tool carriages 386 and 387 are adapted to be reciprocated on suitable dovetail guides 388 provided on the support 371 longitudinally, i. e. parallel to the axis of the work W. Rollers 389 and 390 carried on suitable studs 391 and 392 respectively fixed in the tool carriages 386 and 387 operatively engage in the helical slots 384 and 385 of the drum cams 382 and 383. This arrangement causes reciprocation of the tool carriages 386 and 387 when the shaft 309 is rotated in one direction or the other as gear 306 attached thereto is rotated by the segmental gear 302 as previously described.

On the tool carriages is provided the usual means for adjusting tools radially of the work which comprises slides 393 and 394 adapted to be moved radially of the axis of rotation of the work W in suitable dovetail guides 395 and 396 provided on the tool carriages 386 and 387, the usual screws 397 and 398 having graduated collars 399 being utilized to facilitate accurate setting of the tools carried in tool holders 401 and 402 fixed to the slides 393 and 394 for proper sizing of the work.

The helix angles to the cam slots 384 and 385 of the respective cams 382 and 383 may be varied to give any desired rate of feed to each of the tool carriages 386 and 387 independently. Also, by properly arranging the helix angles of the slots and timing the change of angularity in proper relation with changes in spindle speed rotation a uniform rate of feed for the tools can be produced at all times on the work piece W.

Operation and control

For convenient operation of the machine, a main control station 403 is located at the front of the machine facing the operator and also a control station 423 is provided at the rear of the machine for purposes of facilitating setting the tools of stations one and two.

The detailed arrangement of the front control station 403 is clearly shown in Fig. 18. The four-element push button station 404 consists of a single-pole double-throw turn button 405 marked "Hand feed" on the left and "Auto feed" on the right; a momentary contact button 406 marked "Run"; a momentary contact button 407 marked "Stop"; and a single-pole double-throw turn button 408 marked "Pump on" on the left and "Pump off" on the right. The four-element push button station 409 consists of a red indicating lamp 410; a momentary contact button 411 marked "Index"; a momentary contact button 412 marked "Reset"; and a green indicating lamp 413. The single element push button station 414 comprises the momentary contact button 415 marked "Hand feed." The feed control lever 416 is fixed to the rock shaft 417, which shaft is carried in the supporting plate 418, which is secured to the support 246 by a suitable bracket 419, the various push button stations 404, 409 and 414 being attached to the plate 418. When the lever 416 is in a vertical position the tools have no feed motion. When moved to the left the tools feed forward to cutting operation and when moved to the right the tools are rapidly withdrawn from the work.

The rock shaft 417 extends to the rear of the machine and is supported in a plate 420 carried on a suitable bracket 421, also fixed to the support 246. A lever 422 similar to lever 416 is attached to the rock shaft 417. Fig. 19 shows the arrangement of the rear control station 423, showing the lever 422 carried on the rock shaft 417 supported in plate 420. At this station when the lever 422 is moved to the right the tools feed to the work, and when the lever 422 is moved to the left the tools are rapidly returned from the work. A three-element push button station 424 is attached to the plate 420 and comprises a momentary contact button 425 marked "Hand feed"; a momentary contact button 426 marked "Run"; and a momentary contact button 427 marked "Stop." The main purpose of the rear control station 423 is to provide convenient control of the machine from the rear for setting the various tools of stations one and two.

A lever arm 428, attached to the rock shaft 417, is conected by suitable linkage 429 (see Fig. 14) to the piston 430 of the two-way solenoid operated valve 431, so that the piston 430 can be reciprocated axially upon manipulation of the levers 416 or 422.

Various limit switches are utilized in controlling the machine as follows:

Limit switch LS—1, carried on bracket 221 as described, Figs. 3, 5 and 6, is normally open and is closed when the indexing plunger 213 is fully engaged in the slot 227 by contact of the pin 217 with the actuating lever 219 of this limit switch.

Limit switch LS—3 carried on bracket 220 as described (Figs. 3, 5 and 6) is normally closed and is opened when the indexing plunger 213 is completely disengaged from the slot 227 by contact of the pin 217 with the actuating lever 218 of this limit switch.

Limit switch LS—4 is operated by suitable dogs 432 secured to the surface 433 of the housing 65 carried by the drum 5, (Figs. 2, 3, 7 and 26). The switch, operated by the rotation of the drum 5 momentarily during the indexing operation, is held open for at least ⅕ second and then closed when the drum 5 is in position for the indexing pin 213 to enter the slot 227.

Limit switches LS—5 and LS—6 (Fig. 14) are normally open switches carried on suitable supports 434 and 435 fixed to the right hand support 3a in such a way that pins 436 and 437 fixed to the feed rack 301 actuate the switches LS—5 and LS—6, respectively. Limit switch LS—5 is closed only at the reverse limit of travel of rack 301 in returning the tools from the work. Limit switch LS—6 is closed only at the forward limit of travel of rack 301 in feeding the tools to the work.

Limit switch LS—7 is a single-pole double-throw snap action switch carried on a suitable bracket 438 (Fig. 14) also mounted on the right hand support 3a so that the pin 439 fixed to the rack 301 actuates this switch in either direction as the rack 301 is reciprocated to feed the tools to or from the work. This switch is actuated on the forward or feeding movement of rack 301 to change the main drive motor 47 from high speed to low speed at a predetermined position of the tools just prior to the final cutting operation of the tools on the work. The switch LS—7 is tripped as the rack 301 returns to traverse the tools away from the work W, again changing the main drive motor to high speed.

The operation of the machine is substantially as follows: Referring particularly to Figs. 25 and 26, the machine is here shown about to begin the cutting cycle; the indexing plunger is fully engaged in an indexing slot 227, the plunger 249 is engaged with the plug 251 of a center drive chuck 6, and the latch 287 has tightly secured the disc 275 of drum 5 against the block 278. The feed lever 416 has been moved to feed forward position, allowing fluid pressure from the pump 169 to pass through lines 440—441 into the piston head chamber 442 of cylinder 295. At the beginning of the cutting operation the two-speed motor 47 is revolving the spindles at relatively high speed. As the rack 301 moves in feeding direction for moving the tools to the work the pin 439 trips the limit switch LS—7 at a predetermined point near the end of the feeding stroke, whereupon the speed of the motor 47 is changed to a relatively slow rate as the tools finish the cutting operation and dwell for final finish of the work W.

At the end of the feeding stroke, pin 437 on the rack 301 engages the normally open limit switch LS—6, whereupon through suitable electrical means, the solenoid 443 of valve 431 is energized, which shifts plunger 430 so that pressure is cut off from line 441 and permits pressure to enter line 444 passing through the check valve 445 and into the rod end chamber 446 of the cylinder 295 to cause rapid withdrawal of the tool by returning the rack 301 to its starting position. When pressure is being applied in chamber 442 of cylinder 295 in feeding the tools to the work, fluid is displaced from chamber 446 which cannot escape through the check valve 445, but must pass through the adjustable volume and pressure control valve 447, the proper adjustment of this valve giving the desired rate of feed.

At the fully withdrawn position of the tools, a pin 436 on the rack 301 has engaged and closed the normally open limit switch LS—5 which energizes solenoid 448 of valve 450 and solenoid 449 of valve 451. The solenoid 448 is momentarily energized to shift plunger 452 so as to cut off the pressure supply of line 440 from reaching the fluid pressure indexing motor 205 through lines 453 and 454 during the time the indexing plunger 213 is withdrawn from the slot 227, due to energizing solenoid 449 which shifts plunger 445 of valve 451 to apply pressure from line 440 through lines 456 and 240 for withdrawing the plunger 213.

The pin 217 on the indexing plunger 213 opens the normally closed limit switch LS—3 when the plunger is fully withdrawn from the slot 227, thereby energizing solenoid 457 of valve 450 to shift plunger 452 so that pressure from line 440 can pass through lines 453 and 454 to the fluid pressure motor 205 to cause the drum 5 to index. Dogs 458 secured to the surface 433 of housing 65 depress the plunger 459 of the fluid pressure decelerating valve 460 (Figs. 2 and 3), which restricts the flow into line 454, so that the motor 205 and the rate of indexing of the drum 5 are slowed down just before the indexing plunger 213 is ready to enter the next indexing slot 227.

Limit switch LS—4 is then held open momentarily for approximately ⅕ of a second which energizes solenoid 461 of valve 451 shifting plunger 455 so that pressure from line 440 passes through line 241 to move the indexing plunger 213 in to the indexing slot 227. The pin 217 then engages and closes the limit switch LS—1 when the plunger 213 has fully entered the slot 227, thus energizing the solenoid 462 of valve 431 to shift plunger 430 so that pressure from line 440 is again applied through line 441 to chamber 442 of cylinder 295 to feed the tools to the work again.

The plunger 249 withdraws from the plug 251 of the chuck 6 simultaneously at the time of withdrawal of the indexing plunger 213 from the slot 227. The plunger 249 does not engage the plug 251 until the indexing plunger 213 has substantially entered all the way into the slot 227. We accomplish this result by connecting line 266 of cylinder 253 to lines 240 and 456 and connecting line 265 of the cylinder 253 to lines 243 and 463, the line 463 connecting through a check valve 464 to line 241. The line 243 is only open to the cylinder chamber 244 when the plunger 213 is fully engaged in slot 227 so that the piston 236 valves or prevents the forward stroke of plunger 249 until the indexing plunger is substantially engaged in slot 227. The check valve 464 is provided in line 463 to permit trapped fluid to escape from lines 265 and 243 when the piston 236 and plunger 213 are moved to withdraw the plunger 213 from the slot 227.

The drum clamp cylinder 281 has the line 291 connected to line 444 and line 292 connected to line 441 so that when the tools begin to feed forward by applying pressure in chamber 442 of cylinder 295 the disc 275 will be clamped and when pressure is applied in chamber 446 of cylinder 295 to return the tools and hold them in return position the disc 275 will be unclamped.

Suitable pressure relief valves 465 and 466 are provided in lines 440 and 441 respectively, for selecting proper operating pressures for the various hydraulic devices. Drain lines 467 carry by-passed fluid from these valves and the exhaust fluid from the hydraulic motor 205 to a fluid reservoir 468 provided in the base of the machine.

The machine is set for automatic operation as follows: The main line disconnect switch (Fig. 25) in the control cabinet, not shown, is thrown in. In the front control station 403 turn button 405 is set on "Auto feed" and turn button 408 is set on "Pump on." The turn button 408 controls the operation of the coolant pump 469 (Fig. 3) for distributing lubricant to the cutting tools in a usual manner. The momentary contact button 406 is then pushed to start the spindles at all stations except the loading station, the spindles being rotated at a relatively high speed. The tools feed in taking all facing cuts until they approach within approximately .040 inch of the diameter of the work surface to be finished, at which point the spindle speed changes to a relatively slow rate for the remaining portion of the cutting operation, this spindle speed change being automatically accomplished by limit switch LS—7 as described. If, during the time the above functions have been performed, the operator has unloaded and reloaded in the non-rotating spindle in the loading station and wishes to have the drum 5 index to the next position, he then presses the momentary contact button 411 which automatically presets the control for indexing the drum 5 at the proper time when the tools have finished their cutting operations and returned to their initial position withdrawn from the work W.

If the operator does not press the momentary contact button 411 the machine will run idle with the tools returned from the work and remain in this position until the button 411 is pressed. The object of this feature is to prevent the machine from automatically indexing before the operator has unloaded and properly reloaded the idle spindle in the loading station. When the button 411 is pressed, the green indicating lamp 413 goes out and the red indicating lamp comes on, informing the operator that the machine will index automatically upon completion of the cutting operation then in progress. When the green indicating lamp 413 is burning the operator is informed that the machine will not index but will idle with the tools retracted from the work after the cutting operation then in progress is finished.

If the operator has pressed the momentary contact button 411 for indexing and then decides not to have the drum 5 index, he may cancel the indexing by pressing the momentary contact button 412, providing he does so before the tools have returned to their initial position withdrawn from the work. If the momentary contact button 407 is pressed while the control is set for automatic operation, the spindles and fluid pressure pump motor 170 will stop and the feed handles 416 and 422 will be thrown to traverse reverse positions due to solenoid 443 being energized by suitable electrical means in the control panel (Fig. 25). The tools, however, do not traverse return to their initial positions but return only part way because the fluid pressure for actuating the feed cylinder 295 has dropped to zero when the pump motor 170 stops. Upon pressing the button 406 the tools are returned to their initial starting position.

Should the operator desire to have the tools dwell at the end of the feeding stroke, as when setting the tools to properly size the work piece, he may do so by setting the turn button 405 at "Hand feed" position, whereupon the tools will feed to the end of the feeding stroke and remain there until the button 405 is again set at the "Auto feed" position when the tools will return to initial position.

The tools may be moved to or from the work manually by manipulating the lever 416 or 422 and by pressing the momentary contact button 415 or 425 of the front and rear control stations 403 and 423, respectively.

Manual indexing of the machine is also provided for by a suitable turn button station 470 (Fig. 25) located in the control panel having "Hand index" and "Auto index" positions. When the "Hand index" position is selected for turn button 470, the fluid pressure pump motor 170 starts immediately and by pressing momentary contact button 411 and immediately letting go of the button the machine will index one position. If the button 411 is pressed again while the drum 5 is indexing the indexing will stop until the button 411 is again released, the drum 5 continuing to index until indexed one position. The control may also be arranged so that the drum 5 will index as long as the button 411 is being pressed. When the "Hand index" position has been selected for the turn button station 470 the spindle motor 47 cannot be operated. When the turn button station is set at "Auto index" the machine is again in condition for automatic operation as described.

Having fully described our invention, what we claim as new and desire to secure by Letters Patent, is:

1. A multiple spindle machine comprising a rotatable carrier member, a series of work spindles each having a center drive chucking device and centers mounted on the carrier member, tools located at indexed stages adapted to engage work pieces held in the chucking devices, means for rotating the carrier member selectively to said stages, and means for rotating the chucking devices at said stages.

2. A multiple spindle machine comprising a rotatable carrier member, a series of work spindles each having a plurality of center drive chucking devices mounted on the carrier member, cutting tools at selected stages adapted to engage work held in said chucking devices, means for rotating the carrier member to bring said work spindles selectively to said stages, and means for rotating the chucking devices at said stages.

3. A multiple spindle machine comprising a rotatable carrier member, a series of work spindles each having a plurality of center drive chucking devices and centers mounted in the carrier member, cutting tools at selected stages adapted to engage work held in said chucking devices, means for rotating the carrier member to bring said work spindles selectively to said stages, means for rotating the chucking devices at said stages, and means for loading and unloading work axially of said chucking devices.

4. A machine of the class described including a rotatable member carrying a plurality of independently operable work holders, means providing a lesser number of work stations than work holders to establish an accessible loading station, means for rotating said rotatable member to bring said work holders selectively to said stations, means for driving said work holders, means automatically operated by the rotation of said rotatable member to render the means for driving said work holders ineffective thereon at the loading station, and manually operated means for alternatively rendering the means for operating said work holders effective and ineffective, for purposes of orientation.

5. A machine of the class described including a rotatable member carrying a plurality of independently operable work holders, means providing a lesser number of work stations than work holders to establish an accessible loading station, means for rotating said rotatable member to bring said work holders selectively to said stations, means for driving said work holders, means operating in conjunction with the rotation of said rotatable member for automatically rendering the means for driving said work holders alternatively effective and ineffective upon movement of said rotatable member, and automatic means for arresting operation of work holders in the loading station when the means for driving the work holders is rendered ineffective.

6. A machine of the class described including a rotatable carrier member supporting a plurality of rotatable work holders, means for providing a plurality of stations comprising a lesser number of tool holder units than work holders, tools in said units, means for rotating said carrier to present said work holders selectively to said stations, means for causing relative feeding of the work holders and tools at certain of said stations, and means operated by the last mentioned means for synchronously rotating said work holders at a plurality of different speeds.

7. A machine of the class described including a rotatable carrier member supporting a plurality of rotatable work holders, means for providing a plurality of stations comprising a lesser number of tool holder units than work holders, tools in said units feedable relative to said work holders, hydraulic power means for rotating the carrier to present said work holders selectively to said stations, electric power means for rotating the work holders, hydraulic power means for causing relative tool feeding, and electrically operated control means for rendering said power means effective or ineffective.

8. A machine of the class described including a rotatable member carrying work holders, indexing means for said member, means for locking said member when not in transit, means for locking said work holders when not in transit, means for clamping said member in indexed position, and means for energizing said means in sequential relationship.

9. In a multiple spindle machine of the class described, a frame, a carrier member rotatably mounted in said frame, work holders mounted on said carrier member, tool holder units mounted on said frame at a plurality of selected stations, indexing means for said carrier, whereby said carrier may be moved to present said work holders to said stations, mounted on said frame, locking means for said carrier mounted on said frame, locking means for said work holders mounted on one of said tool holder units, and means for operating said indexing and locking means.

10. In a multiple spindle machine of the class described, a frame, a carrier member rotatably mounted in said frame, work holders mounted on said carrier, tool holder units mounted on said frame at a plurality of selected stations, indexing means for said carrier to present said work holders selectively to said stations, locking means for said work holders mounted on said tool holder units, and means for operating said indexing and locking means.

11. In a multiple spindle machine of the class described, a frame, a carrier member rotatably mounted in said frame, center drive chucks mounted on said carrier, tool holders units mounted on said frame at a plurality of stations, indexing means for said carrier whereby work pieces in said chucks may be presented at said stations, means for locking said chucks to said tool holder units, and means for rendering said indexing and locking means operative.

12. In a multiple spindle machine of the class described, a rotatable carrier member, means for rotating said member, work holders mounted on said carrier, means for rotating said work holders, tool holder units associated with said work holders, tool holders in said units, means for causing simultaneous relative feeding and rapid traverse of said tool holders and work holders, said last mentioned means being independent of the means for rotating the carrier member and work holders.

13. In a multiple spindle machine of the class described, a rotatable carrier member, means for rotating said carrier member, work holders mounted on said carrier member, tool holders associated with said work holders, means for causing relative feeding of said tool holders and work holders, locking means for said carrier member when not rotating, and hydraulic motive means for the means for rotating the carrier member, for the means causing relative feeding of the tool holders and work holders, and for the locking means for the carrier member.

14. In a multiple spindle machine of the class described, a rotatable carrier member, work holders mounted on said carrier, tool holder units associated with said work holders, tool holders in said units, means for individually moving some of said tool holders at certain constant feed rates, means for individually moving others of said tool holders at different variable feed rates, and motive means for said tool holder moving means.

15. In a multiple spindle machine of the class described, a rotatable carrier member, a rotatable work holder mounted on said carrier, a variable speed means for rotating said work holders, tool holder units associated with said work holders, tool holders in said units, means, independent of the means for rotating the work holders, for causing relative feeding of the tool holders and work holders, and mechanism operative to maintain predetermined rates of tool holder feed regardless of the speed of rotation of the work holders.

16. In a multiple spindle machine of the class described, a rotatable carrier member, rotatable work holders mounted on said carrier, a variable speed means for rotating said work holders, tool holder units associated with said work holders, tool holders in said units, means, independent of the means for rotating the work holders, for causing relative feeding of the tool holders and work holders, and mechanism operative to maintain predetermined constant and variable feed rates for the tool holders.

17. In a machine of the character described, a hydraulic feed cylinder, a piston reciprocable in said cylinder, a source of hydraulic pressure, electrically operated control means for applying said hydraulic pressure to said cylinder to reciprocate said piston, a rack connected to said piston, a feed gear segment actuated by said rack, tool holder units, with reciprocable tool holders, connected to said gear segment, electrical means for operating said control means, and means on said rack for rendering said electrical means operative.

18. In a machine of the character described, a hydraulic feed cylinder, a piston reciprocable in said cylinder, a source of hydraulic pressure, electrically operated control means for applying said hydraulic pressure to said cylinder to reciprocate said piston, a rack connected to said piston, a feed gear segment actuated by said rack, tool holder units, with reciprocable tool holders, connected to said gear segment, and electrical means for operating said control means, said electrical means being rendered operative by the forward motion of the rack.

19. In a machine of the character described, a hydraulic feed cylinder, a piston reciprocable in said cylinder, a source of hydraulic pressure, combined manual and electrically operated control means for applying said hydraulic pressure to said cylinder to reciprocate said piston, a rack connected to said piston, a feed gear segment actuated by said rack, tool holder units, with reciprocable tool holders, connected to said gear segment, and electrical means operated by the movement of said rack for operating said control means, said control means being manually operable at all times.

20. In a machine of the character described, a hydraulic feed cylinder, a piston reciprocable in said cylinder, a source of hydraulic pressure, control means for applying said hydraulic pressure to said cylinder to recpricate said piston, a rack connected to said piston, a feed gear segment actuated by said rack, tool holder units, with reciprocable tool holders, connected to said gear segment, rotatable work holders associated with said tool holders, means for rotating said work holders, electrical means for changing the speed of said rotating means, and means on said rack for actuating said electrical means.

21. In a machine of the character described, a rotatable work holder carrying member, means for clamping said member against rotation, a reciprocable hydraulic means for actuating said clamping means, tools associated with said work holders, tool feed mechanism for said tools, a reciprocable hydraulic means for actuating said tool feed mechanism, and hydraulic pressure means for operating both of said reciprocable hydraulic means so that said clamping means will be effective when said tools are feeding to the work holders and said clamping means will be ineffective when the tools are retracting from the work holders.

22. An indexing mechanism comprising a rotatable member hydraulic means for rotating said member, hydraulically operated means for locking said member from rotation, a source of hydraulic pressure for operating said rotating and locking means, electrically operated control means for said source of hydraulic pressure and electrical means actuated by the operation of the locking means, said electrical means being effective to operate said control means.

23. In an indexing mechanism, a rotatable member, hydraulic means for rotating said member, hydraulically operated means for locking said member from rotation, tools feedable relative to said member, reversible hydraulically operated feeding mechanism for said tools, a source of hydraulic pressure for operating said rotating, locking, and feeding mechanism, electrically operated control means for said feeding mechanism, and electrical means, actuated by the operation of the lock means, for operating said control means.

24. In an indexing mechanism, a rotatable member, hydraulic means for rotating said member, hydraulically operated means for locking said member from rotation, tools feedable relative to said member, reversible hydraulically operated feeding mechanism for said tools, a source of hydraulic pressure for operating said rotating, locking, and feeding mechanism, electrically operated control means for said rotating means, electrically operated control means for said locking means, and electrical means actuated by the operation of said feeding mechanism, for operating said control means.

25. In an indexing mechanism, a rotatable member, hydraulic means for rotating said member, hydraulically operated means for locking said member from rotation, a source of hydraulic pressure for operating said rotating and locking means, electrically operated control means for rendering said locking means effective and ineffective, electrical means for said control means, and means on said rotatable member for actuating said electrical means so that said locking means may be rendered momentarily ineffective during a portion of the rotation of said rotatable member.

26. In an indexing mechanism, a rotatable member, hydraulic means for rotating said member, a source of hydraulic pressure for operating said rotating means, a control means for said rotating means, a decelerating means for said rotating means, and means on said rotatable member for actuating said decelerating means so that said member may be rotated at a slower rate during a portion of said rotation.

27. In a multiple spindle indexing machine, a rotatable carrier, spindles mounted on said carrier, hydraulic means for rotating said carrier, locking means acting on said carrier to prevent rotation of said carrier, locking means acting on said spindles to prevent rotation of said carrier, a source of hydraulic pressure for operating said rotating and locking means, control means for said first mentioned locking means, said second mentioned locking means being controlled by the operation of the first mentioned locking means.

28. In a multiple spindle indexing machine, a rotatable carrier, spindles mounted on said carrier, hydraulic means for rotating said carrier, locking means acting on said carrier to prevent rotation of said carrier, locking means acting on said spindles to prevent rotation of said carrier, a source of hydraulic pressure for operating said rotating and locking means, control means for said first mentioned locking means, and means associated with the operation of the first mentioned locking means for controlling the operation of the second mentioned locking means so that said first mentioned locking means becomes fully effective before said second mentioned locking means becomes effective.

29. In a machine of the character described, a rotatable carrier member, means for indexing said carrier member, electrically operated means for controlling the operation of said last mentioned means, and manually operable means for actuating said electrical means comprising a remote control push button station, a momentary contact push button for causing indexing of said rotatable member, a momentary contact push button for canceling indexing of said rotatable member, and warning lights associated with said push buttons to indicate to the operator which of said push buttons has last been operated.

30. A multiple spindle machine comprising a rotatable carrier member, a series of work spindles each having a plurality of center drive chucking devices mounted on the carrier member, tools adapted to be fed relative to the work in said spindles, some of said tools being located between said chucking devices, others located each side of said chucking devices, means for rotating the carrier member, means for rotating the chucking devices, and means for feeding the tools.

31. A multiple spindle lathe, comprising a rotatable carrier member, a series of work spindles mounted on said carrier member, each of said spindles comprising a single ring gear chucking device adapted to center and positively drive a work piece intermediate its ends and centers adapted to axially align and steady the ends of said work piece, cutting tools adapted to engage work pieces held on said spindles, means for rotating the carrier member, and means for rotating said chucking devices.

32. A multiple spindle lathe, comprising a rotatable carrier member, a series of work spindles, each comprising a plurality of synchronously rotatable ring gear chucking devices, mounted on said carrier, cutting tools adapted to engage work pieces held in the chucking devices, some of said tools being located between said chucking devices, others of said tools being located each side of said chucking devices, means for rotating said carrier member, and means for rotating said chucking devices.

33. A multiple spindle lathe comprising a rotatable carrier member, a series of work spindles mounted on the member, means on the work spindles for chucking and rotating work pieces from a single position located intermediate the ends of the work pieces and means for locating and steadying the ends of said work pieces, cutting tools adapted to engage work pieces held in said chucking and steadying means, said tools operating each side of said chucking means and between said steadying means, means for rotating the carrier member, and means for rotating the chucking means.

34. In a multiple spindle center drive lathe, a rotatable member carrying a plurality of independently operable center drive chucks, a lesser number of work stations than center drive chucks to provide an accessible loading station, means for moving said rotatable member from station to station, means for driving said center drive chucks, and means operating in conjunction with the movement of said rotatable member to render the means for driving said center drive chucks effective thereon.

35. In a multiple spindle center drive lathe, a rotatable member carrying a plurality of independently operable center drive chucks, a lesser number of work stations than center drive chucks to establish an accessible loading station, means for rotating said rotatable member to bring said center drive chucks selectively to said stations, means for driving said center drive chucks, and means operating in conjunction with the rotation of said rotatable member to render the means for driving said center drive chucks effective.

36. In a multiple spindle machine tool, a rotatable carrier member, rotatable work holders on said carrier, tool holder units associated with said work holders, tool holders in said units, means for causing simultaneous variable feeding and rapid traverse of said tool holders, means for rotating said work holders, and means for automatically rendering said last two mentioned means effective or ineffective in a predetermined sequence.

37. In a multiple spindle machine tool, a rotatable carrier member, rotatable work holders on said carrier, tool holder units associated with said work holders, tool holders in said units, means for moving said tool holders individually at different rates of feeding, means for rotating said work holders, and means for automatically rendering said last two mentioned means effective or ineffective in a predetermined sequence.

38. In a multiple spindle machine tool, a rotatable carrier member, rotatable work holders on said carrier, tool holder units associated with said work holders, tool holders in said units, means for moving said tool holders individually at different variable rates of feeding, means for rotating said work holders, and means for automatically rendering said last two mentioned means effective or ineffective in a predetermined sequence.

39. In a multiple spindle machine tool, a rotatable carrier member, rotatable work holders on said carrier, tool holder units associated with said work holders, tool holders in said units, means for moving some of said tool holders at a constant feed rate and other of said tool holders at variable feed rates, means for rotating said work holders, and means for automatically rendering said last two mentioned means effective or ineffective in a predetermined sequence.

40. A multiple spindle machine comprising a rotatable carrier member, a series of work spindles, each having a center drive chucking device, mounted on the carrier member, tools located at indexed stages adapted to engage work pieces held in the chucking devices, means for rotating the carrier member selectively to said stages, and means for rotating the chucking devices at said stages.

41. A multiple spindle machine comprising a rotatable carrier member, a series of work spindles, each having a center drive chucking device, mounted on the carrier member, tools located at indexed stages and operable, each side of said chucking device adapted to engage work pieces held in said devices, means for rotating the carrier member selectively to said stages, and means for rotating the chucking devices at said stages.

42. A multiple spindle machine comprising a rotatable carrier member, a series of work spindles, each having a center drive chucking device and centers, mounted on the carrier member, tools located at indexed stages adapted to engage work pieces held in the chucking devices each side thereof and between said center, means for rotating the carrier member selectively to said stages, and means for rotating the chucking devices at said stages.

43. A multiple spindle machine comprising a rotatable carrier member, a series of work spindles, each having a center drive chucking device and centers, mounted on the carrier member, tools located at indexed stages adapted to engage work pieces held in the chucking devices at a plurality of axially spaced positions between said chucking devices and centers, means for rotating the carrier member selectively to said stages, and means for rotating the chucking devices at said stages.

44. In a crankshaft lathe, a bed, a work carrier movably mounted on said bed, means on said carrier to support and revolve a plurality of crankshafts intermediate their ends, tool feeding devices mounted on said bed at indexed stages and operable to feed appropriate tools for machining the stub end and also the flange end of said crankshafts, further tool feeding means also mounted on said bed for machining all of the line bearings of said crankshafts, and means for moving said carrier selectively to said stages.

45. In a crank shaft lathe having a bed, means on said bed to support and revolve a plurality of crankshafts intermediate their ends, said supporting means being movable to present said crankshaft successively to various work stages, tool feeding devices located at said various stages, and means for operating said tool feeding devices to cause relative feeding of said tools and said crankshafts, certain of said tool feeding means being simultaneously operable at at least one of such stages for machining the stub end, the flange end and all of the line bearings of said crankshafts thereat.

WILLIAM F. GROENE.
WALTER R. MEYER.